United States Patent
Lee et al.

(10) Patent No.: US 12,025,519 B2
(45) Date of Patent: Jul. 2, 2024

(54) APPARATUS AND METHOD FOR TESTING PRESSURE SENSOR AND DISPLAY DEVICE USING THE SAME

(71) Applicant: Samsung Display Co., Ltd., Yongin-Si (KR)

(72) Inventors: Tae Hee Lee, Hwaseong-si (KR); Sung Kook Park, Suwon-si (KR); So Hee Park, Cheonan-si (KR); Hee Seomoon, Hwaseong-si (KR); Won Ki Hong, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 159 days.

(21) Appl. No.: 17/520,412

(22) Filed: Nov. 5, 2021

(65) Prior Publication Data

US 2022/0057286 A1 Feb. 24, 2022

Related U.S. Application Data

(62) Division of application No. 16/285,071, filed on Feb. 25, 2019, now Pat. No. 11,215,522.

(30) Foreign Application Priority Data

Aug. 16, 2018 (KR) .................. 10-2018-0095712

(51) Int. Cl.
*G01L 25/00* (2006.01)
*G06F 3/041* (2006.01)
*G06F 3/14* (2006.01)

(52) U.S. Cl.
CPC ............ *G01L 25/00* (2013.01); *G06F 3/0418* (2013.01); *G06F 3/14* (2013.01)

(58) Field of Classification Search
CPC ... G01L 25/00; G01M 99/007; G01M 99/008; G01N 3/30; G01N 2203/0023; G01N 2203/0282

See application file for complete search history.

(56) References Cited

U.S. PATENT DOCUMENTS 4,179,941 A   12/1979 Walter
4,589,288 A * 5/1986 Porter ...................... G01N 3/20
                                                  73/849

(Continued)

FOREIGN PATENT DOCUMENTS

CN   202770935 U    3/2013
CN   106768776 A *  5/2017

(Continued)

OTHER PUBLICATIONS

Korean Notice of Allowance corresponding to Application No. 10-2018-0095712 and issued on Sep. 22, 2023, 2 pages.

*Primary Examiner* — Natalie Huls
(74) *Attorney, Agent, or Firm* — Innovation Counsel LLP

(57) ABSTRACT

A test apparatus includes: a stage having a planar surface extending in a first direction and a second direction crossing the first direction; a mounting portion that is disposed on the stage to place a test member thereon; an angle adjusting portion adjusting a first angle of the mounting portion to incline the mounting portion with respect to the planar surface of the stage; and a pressing guide disposed on the stage and moving a pressing member in the first direction, the second direction, and a third direction normal to the planar surface of the stage.

3 Claims, 24 Drawing Sheets

(56) References Cited

U.S. PATENT DOCUMENTS

| | | | |
|---|---|---|---|
| 5,003,254 A | 3/1991 | Hunt et al. | |
| 5,616,848 A | 4/1997 | Hemingway et al. | |
| 6,450,469 B1 | 9/2002 | Okuno | |
| 7,538,760 B2 | 5/2009 | Hotelling et al. | |
| 8,654,524 B2 | 2/2014 | Pance et al. | |
| 8,686,952 B2 | 4/2014 | Burrough et al. | |
| 8,787,006 B2 | 7/2014 | Golko et al. | |
| 10,502,712 B2 | 12/2019 | Hall | |
| 10,656,206 B1 * | 5/2020 | Patil | G01R 31/31905 |
| 11,614,818 B2 | 3/2023 | Kwak et al. | |
| 2002/0135395 A1 | 9/2002 | Smith et al. | |
| 2005/0285105 A1 | 12/2005 | Xiao | |
| 2007/0257698 A1 | 11/2007 | Zhu et al. | |
| 2011/0239776 A1 | 10/2011 | Hsu et al. | |
| 2013/0155627 A1 | 6/2013 | Mareno et al. | |
| 2014/0028575 A1 | 1/2014 | Parivar et al. | |
| 2014/0085213 A1 | 3/2014 | Huppi et al. | |
| 2014/0091857 A1 | 4/2014 | Bernstein | |
| 2014/0092064 A1 | 4/2014 | Bernstein et al. | |
| 2014/0182392 A1 * | 7/2014 | Woodhull | B24B 1/00 73/851 |
| 2014/0224003 A1 | 8/2014 | Zhang et al. | |
| 2014/0293145 A1 | 10/2014 | Jones et al. | |
| 2016/0062517 A1 | 3/2016 | Meyer et al. | |
| 2016/0133171 A1 | 5/2016 | Li et al. | |
| 2016/0337053 A1 * | 11/2016 | Diperna | H04B 17/21 |
| 2017/0089818 A1 | 3/2017 | Bartlow et al. | |
| 2019/0154555 A1 | 5/2019 | Han et al. | |
| 2019/0339182 A1 | 11/2019 | Chien | |
| 2019/0391058 A1 | 12/2019 | Lee et al. | |
| 2020/0032952 A1 | 1/2020 | Han et al. | |
| 2020/0135535 A1 | 4/2020 | Li | |
| 2020/0258957 A1 | 8/2020 | Kwak et al. | |

FOREIGN PATENT DOCUMENTS

| | | | | |
|---|---|---|---|---|
| CN | 107665910 A | | 2/2018 | |
| GB | 2366391 A | * | 3/2002 | G01N 3/46 |
| JP | 2006-133099 A | | 5/2006 | |
| KR | 10-0941441 B1 | | 2/2010 | |
| KR | 10-1652668 B1 | | 9/2016 | |
| KR | 10-1739075 B1 | | 5/2017 | |
| KR | 2017-0111827 A | | 10/2017 | |
| WO | WO-2011057827 A2 | * | 5/2011 | G01M 7/022 |
| WO | WO-2020107456 A1 | * | 6/2020 | |

* cited by examiner (a)  (b)  (c)

(d)

(a)

(b)

SP1
(a)

SP2
(b)

SP3
(c)

SP4
(d)

APPARATUS AND METHOD FOR TESTING PRESSURE SENSOR AND DISPLAY DEVICE USING THE SAME

CROSS-REFERENCE TO RELATED APPLICATION(S)

This application is a divisional application of U.S. patent application Ser. No. 16/285,071 filed on Feb. 25, 2019, which claims priority under 35 USC § 119 to Korean Patent Application No. 10-2018-0095712, filed on Aug. 16, 2018, in the Korean Intellectual Property Office, the disclosures of which are incorporated herein in their entirety by reference.

BACKGROUND

1. Field of the Invention

The present disclosure relates to an apparatus and method of testing a pressure sensor, and a display device using the same.

2. Description of the Related Art

A display device for displaying an image is used for various electronic appliances for providing an image to a user, such as smartphones, tablet personal computers (PCs), digital cameras, notebook computers, navigators, and televisions. The display device includes a display panel for generating and displaying an image and can incorporate various input devices therein.

Recently, in the fields of smartphones and tablet PCs, a touch panel recognizing a touch input has been widely applied to a display device. The touch panel has a trend to replace existing physical input devices such as a keypad and a mouse because of the convenience of touching directly on the surface of the display device. Recent research focuses on implementing a touch panel capable of detecting various other input signals, for example, by mounting a pressure sensor on a display device in addition to the touch panel.

Among methods for testing an operation and sensitivity of a pressure sensor provided in a display device, a conventional testing method in which a weight is placed on a display panel and then the self-weight thereof is used has been advantageous in that a test can be performed by only the weight. However, recently, when this method is applied to a display device provided with an enlarged display panel having a curved portion, an accurate test could not be performed because a weight may move or run down on the curved surface of the display panel. Therefore, an apparatus for testing an operation and sensitivity of a pressure sensor disposed on the curved portion of a display device is required.

SUMMARY

An aspect of the present disclosure is to provide a test apparatus for testing operation and correcting sensitivity of a pressure sensor that may be disposed on a curved portion of a display panel.

Another aspect of the present disclosure is to provide a method of testing operation and correcting sensitivity of a pressure sensor by using the test apparatus.

Still another aspect of the present disclosure is to provide a display device in which the sensitivity of a pressure sensor is corrected based on test results obtained from the test apparatus.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to one or more embodiments of the present disclosure, a test apparatus, includes: a stage having a planar surface extending in a first direction and a second direction crossing the first direction; a mounting portion disposed on the stage to place a test member thereon; an angle adjusting portion adjusting a first angle of the mounting portion to incline the mounting portion with respect to the planar surface of the stage; and a pressing guide disposed on the stage and moving a pressing member in the first direction, the second direction, and a third direction normal to the planar surface of the stage.

The test member may be a display device including a flat portion and at least one curved portion extending from the flat portion, and wherein the at least one curved portion is provided with at least one pressure sensor.

The pressing member may press the at least one curved portion of the display device.

The pressing guide may include: a rail moving the pressing member in the first direction; a first slide member engaged with the rail and moving the pressing member in the third direction; and a second slide member engaged with the first slide member and moving the pressing member in the second direction.

The test apparatus may further include: a guide arm engaged with the second slide member and supporting the pressing member, wherein the guide arm is provided with a guide ring capable of removably attaching the pressing member.

The guide arm may be provided as a pair of guide arms, and the pair of guide arms is disposed to overlap each other in the third direction and be spaced apart from each other by a predetermined distance.

The test apparatus may further include: an anti-slip member disposed on an upper surface of the mounting portion and preventing the test member from slipping when the mounting portion is inclined by the angle adjusting portion at the first angle.

The angle adjusting portion may be engaged with the mounting portion along a long side of the mounting portion to incline the mounting portion, the first angle ranges between 0° and 360°, and the angle adjusting portion includes a support member supporting the test member placed on the mounting portion.

The test apparatus may further include: a rotating member rotating the mounting portion about an axis extending in the third direction to adjust a second angle between the mounting portion and the stage.

The test apparatus may further include: at least one support member supporting one side of the test member when the mounting portion is inclined at the first angle by the angle adjusting portion, and the at least one support member is disposed on one side of the mounting portion.

The pressing member may include a body and a protrusion that protrudes from a surface of the body.

The protrusion is engaged with a pressing cover that covers the protrusion.

A cross-section of the pressing cover may be any one of a concave center shape, a convex center shape, and a shape having a flat side on one end and a convex side on an opposite end.

According to one or more embodiments of the present disclosure, a test method includes: placing a test member on a mounting portion; adjusting an inclined angle of the mounting portion using an angle adjusting portion; adjusting a position of a pressing guide to correspond to a measurement position of the test member; pressing the test member using a pressing member of the pressing guide; and transmitting pressure information measured from the test member to an external appliance and displaying the pressure information.

The test member may be a display device including a flat portion and at least one curved portion extending from the flat portion, and the at least one curved portion is provided with at least one pressure sensor.

In the adjusting the inclined angle of the mounting portion using the angle adjusting portion, the inclined angle of the mounting portion may be adjusted such that the pressing member vertically presses the curved portion of the display device.

In the pressing the test member using the pressing member of the pressing guide, amounts of pressure applied to the test member may be sequentially changed, operation time of the test member may be checked, and a pressure threshold value at which the test member operates may be recorded on a storage.

According to one or more embodiments of the present disclosure, a display device, includes: a display panel including a flat portion and at least one curved portion extending from the flat portion; at least one pressure sensor disposed on the at least one curved portion and including a plurality of pressure sensing cells; a storage storing a pressure threshold value of the at least one pressure sensing cells, the pressure threshold values being measured by an external test apparatus; and a controller receiving pressure values sensed from the plurality of pressure sensing cells of the at least one pressure sensor, wherein the controller compares the pressure values the pressure threshold value and determines whether or not a pressure is applied to the display device.

The controller may display on the display panel a window indicating to re-measure the pressure values when a predetermined condition is satisfied.

The predetermined condition may be any one of a case where a pressure exceeding a predetermined range is applied to the display device in comparison with the pressure threshold value, a case where a predetermined period expires, and a case where a pressure is applied to the at least one pressure sensor more than a predetermined number of times.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
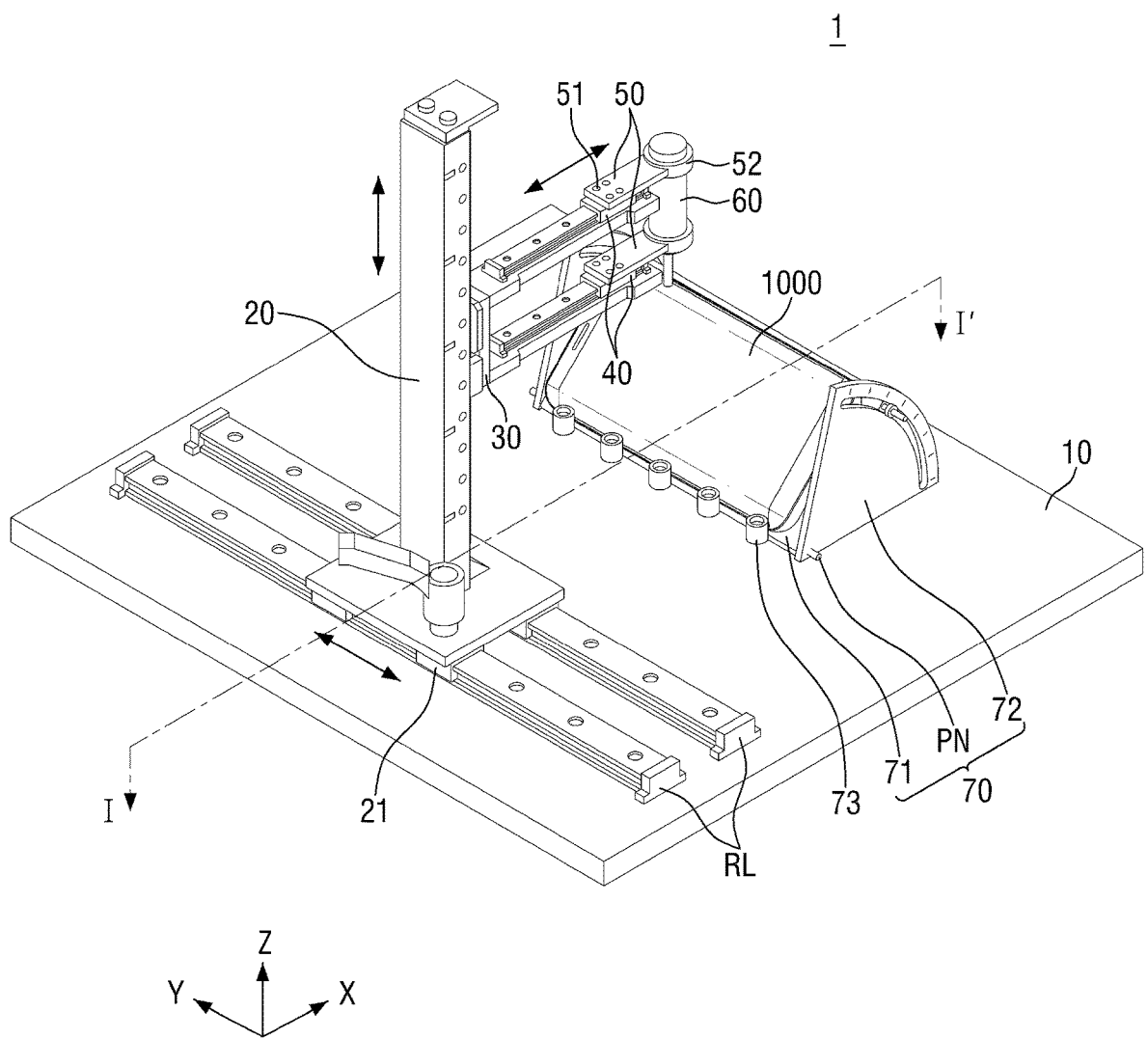
FIG. 1 is a perspective view of a test apparatus for testing a display device according to an embodiment.

The advantages and features of the present disclosure and methods for achieving the advantages and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details and examples provided to assist those of ordinary skill in the art in a comprehensive understanding of the present disclosure.

It will also be understood that when a layer is referred to as being "on" another layer or substrate, it can be directly on the other layer or substrate, or one or more intervening layers may be present. In the accompanying figures, the size and relative sizes of layers, films, panels, regions, etc., may be exaggerated for clarity and descriptive purposes. In addition, like reference numerals denote like elements.

Although the terms first, second, etc. may be used herein to describe various elements, components, regions, layers, and/or, sections, these elements, components, regions, layers, and/or, sections should not be limited by these terms. These terms are used merely to distinguish one element, component, region, layer, and/or, section from another element, component, region, layer, and/or, section. Thus, a first element, component, region, layer, and/or, section discussed below could be termed a second element, component, region, layer, and/or, section without departing from the teachings of the present disclosure.

In concluding the detailed description, those skilled in the art will appreciate that many variations and modifications can be made to the embodiments without substantially departing from the principles of the present disclosure. Therefore, the disclosed embodiments of the present disclosure are used in a generic and descriptive sense and not for purposes of limitation.

Hereinafter, embodiments of the present disclosure will be described with reference to the attached drawings.

Figure 2:
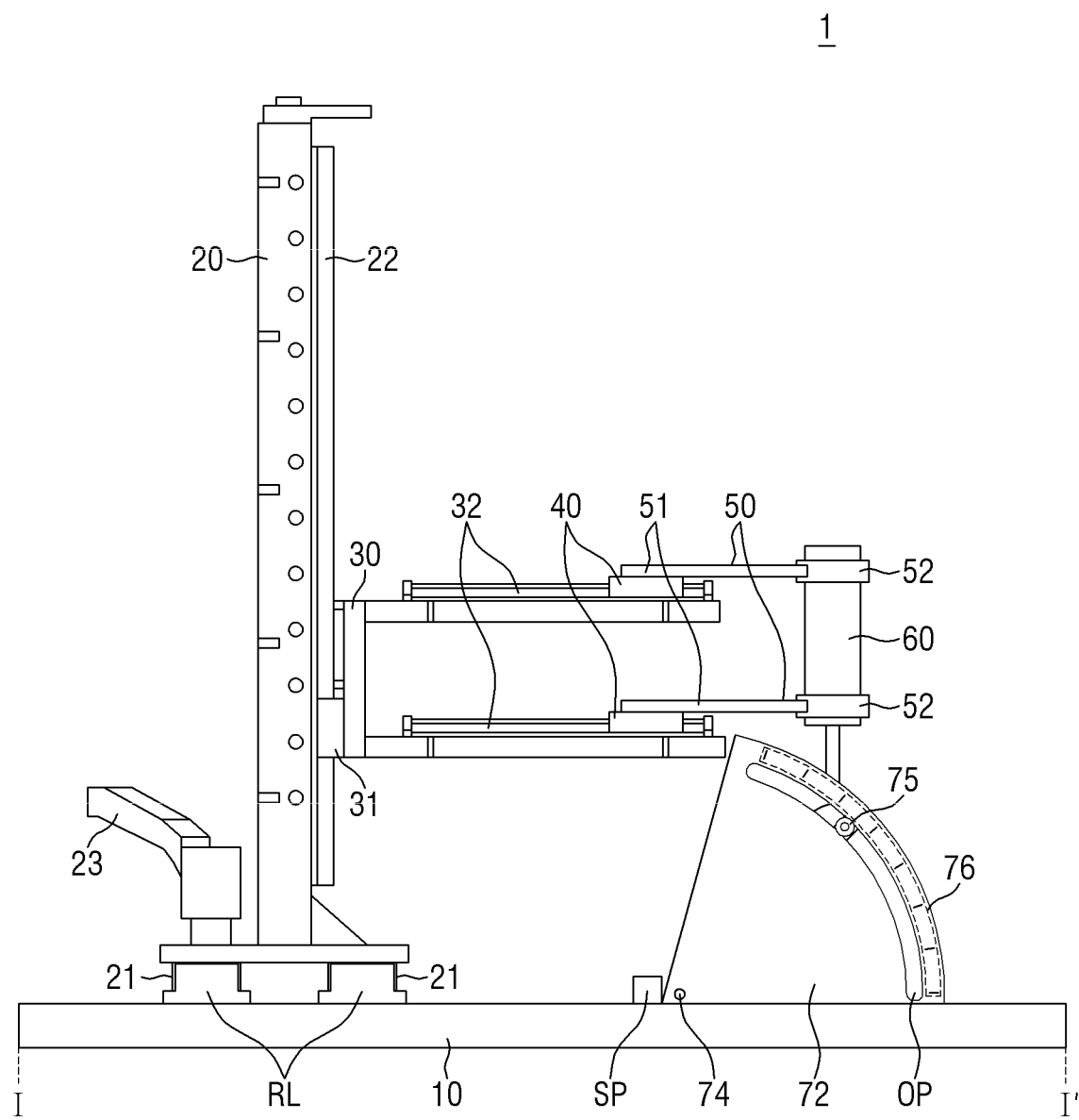
FIG. 2 is a side view of a test apparatus for testing a display device according to an embodiment.

FIG. 1 is a perspective view of a test apparatus for testing a display device according to an embodiment, and FIG. 2 is a side view of a test apparatus for testing a display device according to an embodiment.

Referring to FIGS. 1 and 2, a test apparatus 1 for testing a display device 1000 includes a stage 10, a pressing guide including first, second, and third slide members 20, 30, 40, and a guide arm 50, a pressing member 60, and an angle guide 70.

The stage 10 may include one or more rails RL extending from one side to the other side. For example, the rails RL may include one or more linear motion (LM) guides such that the pressing guide can move precisely over the stage 10. A ruler (not shown) may be provided on the stage 10 to accurately measure and confirm Y-axis coordinates. Thus, a test for the same point of the display device 1000 may be accurately and repeatedly performed.

The pressing guide may include a first slide member 20 that is vertically formed on the stage 10 and engaged with the rails RL to be movable along the Y-axis, a second slide member 30 that is engaged with the first slide member 20 to be movable along the Z-axis, and a third slide member 40 that is engaged with the second slide member 30 to be movable along the X-axis.

The first slide member 20 may include a Z-axis slider supporting portion 22 and one or more Y-axis slider portions 21. The Z-axis slider supporting portion 22 may be disposed on one side of the first slide member 20 and may have the same structure as the rails RL disposed on the stage 10. The Z-axis slider supporting portion 22 may include one or more second linear motion (LM) guides such that the second slide member 30 can move precisely up and down along the Z-axis direction. A ruler (not shown) may be provided around the Z-axis slider supporting portion 22 to accurately measure and confirm Y-axis coordinates. Thus, the test for the same point of the display apparatus 1000 may be accurately and repeatedly performed. The Y-axis slider portions 21 may be disposed on a lower surface of the first slide member 20, and may be engaged with the rails RL to move back and forth along the Y-axis direction.

The second slide member 30 may include an X-axis slider supporting portion 32 and a Z-axis slider portion 31. The X-axis slider supporting portion 32 may be disposed on an upper surface of the second slide member 30 and may have the same structure as the rails RL disposed on the stage 10. The X-axis slider supporting portion 32 may include one or more third linear motion (LM) guides such that the second slide member 30 can move precisely along the X-axis. A ruler (not shown) may be provided around the X-axis slider supporting portion 32 to accurately measure and confirm X-axis coordinates. Thus, the test for the same point of the display apparatus 1000 may be accurately and repeatedly performed. According to one embodiment, the X-axis slider supporting portion 32 may include first and second X-axis slider supporting portions 32 overlapping each other in the Z-axis direction. The first and second X-axis slider supporting portions may be disposed at a predetermined distance along the Z-axis direction.

The Z-axis slider portion 31 may be disposed on one side of the first slide member 20, and may be engaged with the Z-axis slider supporting portion 22 of the first slide member 20 to move up and down along the Z-axis direction.

The third slide member 40 may include a guide arm fixing portion and an X-axis slider portion. The guide arm fixing portion may be disposed on an upper surface of the third slide member 40, and may include at least one screw groove to be engaged with the guide arm 50 through a screw connection. The X-axis slider portion may be disposed on a lower surface of the third slide member 40, and may be engaged with the X-axis slider supporting portion 32 disposed on the upper surface of the second slide member 30 to move back and forth along the X-axis direction. When the X-axis slider supporting portions 32 of the second slide member 30 includes the first and second X-axis slider supporting portions 32, the third slider member 40 may include first and second slider portions 40 that are respectively engaged with the first and second X-axis slider supporting portions 32.

The aforementioned first slide member 20 may further include a fixing member 23 for holding an adjusted position. Each of the second slide member 30 and the third slide member 40 may also include a fixing member (not shown) for holding an adjusted position.

Figure 3:
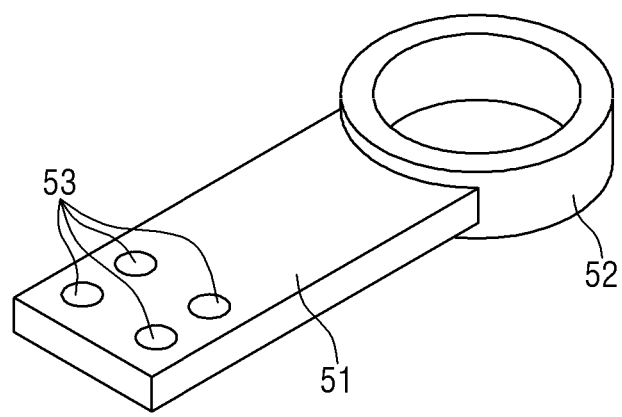
FIG. 3 is a perspective view of a guide arm according to an embodiment.

FIG. 3 is a perspective view of a guide arm according to an embodiment.

Referring to FIG. 3, the guide arm 50 may include a slider fixing portion 51 and a guide ring 52. The slider fixing portion 51 may be disposed on one side of the guide arm 50 and may include at least one screw groove 53. According to an embodiment, four screw grooves 53 may be provided. When the four screw grooves 53 are provided, a square-shaped rim may be formed. The screw grooves 53 may be formed through the guide arm 50 to overlap the screw grooves that are formed in the guide arm fixing portion of the third slide member 40 in the Z-axis direction.

The guide ring 52 may be disposed on the other side of the guide arm 50. The guide ring 52 may have a planar circular shape (or a hollow disk shape). However, the present disclosure is not limited thereto, and the planar shape of the guide ring 52 may be changed depending on the planar shape of the pressing member 60. For example, when the planar shape of the pressing member 60 is a square shape or a regular octagonal shape, the planar shape of the guide ring 52 may also be a square shape or a regular octagonal shape correspondingly. According to an embodiment, the pressing member 60 may be referred to as a weight made of a metal.

According to one embodiment, the planar area of the guide ring 52 may be larger than the planar area of the pressing member 60. However, when the planar area of the guide ring 52 is much larger than the planar area of the pressing member 60, the pressing member 60 may be inserted obliquely such that the display device 1000 and the pressing member 60 may be in an oblique contact with each other, and resultantly, a pressure of the pressing member 60 applied to the display device 1000 may be distorted. Even when the planar area of the guide ring 52 is substantially equal to the planar area of the pressing member 60, the influence of the pressing member 60 being supported by the guide ring 52 may increase, but a pressure of the pressing member 60 applied to the display device 1000 may still be distorted.

To prevent the distortion, the guide arm 50 may include two or more guide arms. In one embodiment, as illustrated in FIG. 2, the guide arm 50 includes first and second guide arms 50 that are respectively coupled to the first and second slide members 40 of the third slide member 40. The volume of the pressing member 60 increases in proportion to its weight. When the large-volume pressing member 60 is supported by one guide arm 50, there is a greater chance that the pressing member 60 may be inserted obliquely, and thus the display device 1000 and the pressing member 60 may be in an oblique contact with each other thereby distorting a pressure of the pressing member 60 applied to the display device 1000. The pressing member 60 having a large volume and supported through the aforementioned first and second guide arms 50 can reduce or prevent distortion of a pressure of the pressing member 60 applied to the display device 1000.

Figure 4:
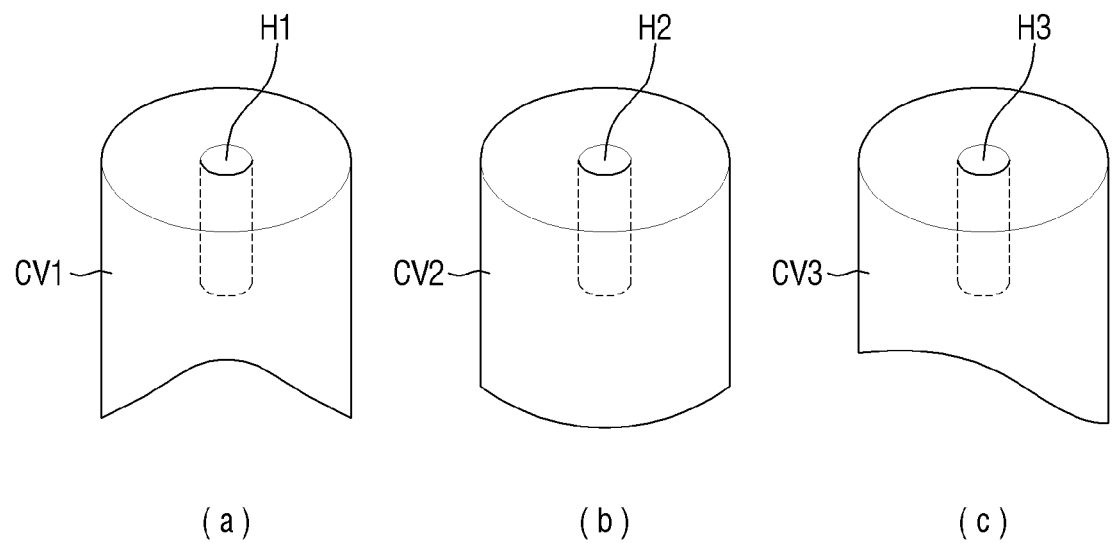
FIG. 4 is a perspective view of various pressing covers and a perspective view showing a state in which the pressing member is engaged with one of the pressing covers according to an embodiment.
Figure 4:
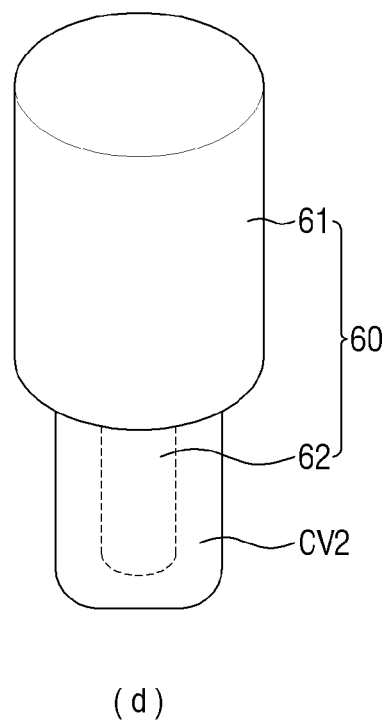
Figure 5:
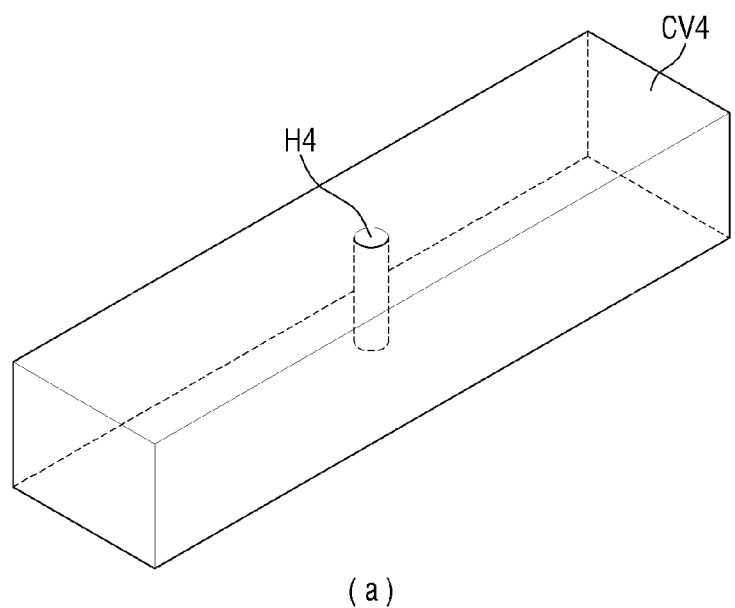
FIG. 5 is a side view of a pressing cover having a rectangular parallelepiped shape and a side view showing a state in which the pressing member is engaged with the pressing cover according to one embodiment.
Figure 5:
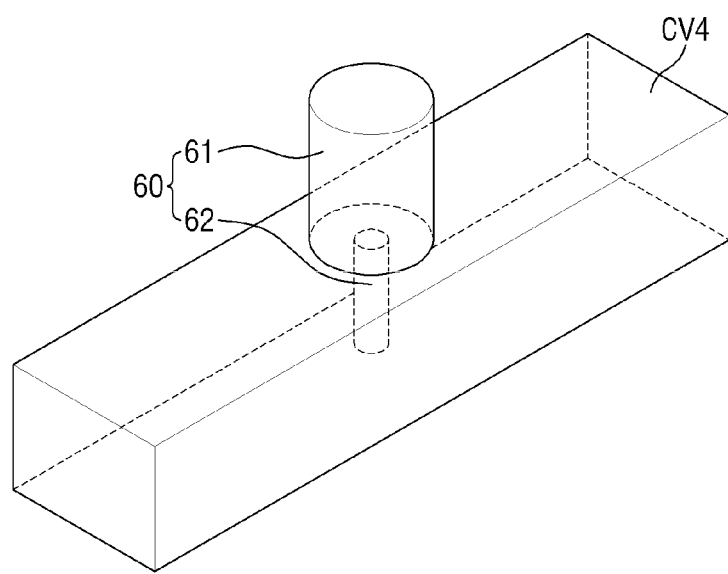

FIG. 4 is a perspective view of various pressing cover and a perspective view showing a state in which the pressing member is engaged with one of the pressing covers according to an embodiment. FIG. 5 is a perspective view of a pressing cover having a rectangular parallelepiped shape and a perspective view showing a state in which the pressing member is engaged with the pressing cover according to one embodiment. Referring to FIGS. 4 and 5, the pressing member 60 according to one embodiment may be divided into a body 61 and a protrusion 62. Both the body 61 and the protrusion 62 may have a cylindrical shape. However, the present disclosure is not limited thereto, and, for example, the shape of the pressing member 60 may be any one of a rectangular columnar and an octagonal columnar shape. The body 61 may be engaged with the aforementioned guide ring 52 of the guide arm 50. Referring to FIG. 4, the protrusion 62 may be engaged with each of the pressing covers CV1, CV2, CV3, and CV4. The diameter of the protrusion 62 may be smaller than the diameter of the body 61, and the length of the protrusion 62 may be shorter than the length of the body 61. For example, the protrusion 62 may have a diameter of 5 mm and a length of 10 mm. The test apparatus 1 shown in FIGS. 1 and 2 may use various pressing members 60 having different weights to test the display device 1000 to apply various pressures to the display device 1000. For example, the pressing member 60 may be fabricated to have a constant weight difference, such as 200 g, 250 g, or 300 g, but the pressing member 60 may freely have any weight within the range of 10 gram to 1000 gram depending on the test application.

Each of the pressing covers CV1, CV2, CV3, and CV4 may be engaged with the protrusion 62 of the pressing member 60 to be brought into direct contact with the display device 1000 during the pressure testing. The pressing covers CV1, CV2, CV3, and CV4 may include engaging portions H1, H2, H3, and H4 (e.g., grooves) and contact portions, respectively. Each of the engaging portions H1, H2, H3, and H4 is engaged with the protrusion 62 of the pressing member 60 to couple each of the pressing covers CV1, CV2, CV3, and CV4 to the pressing member 60. The contact portion that is brought into direct contact with a flat portion or a curved portion of the display device 1000 may have various shapes. According to an embodiment, a user's finger may be used to apply a pressure to pressure sensors 510 and 520, which will be described later, of the display device 1000. The user's finger that contacts the display device 1000 may include at least one of a concave portion, a convex portion, and a flat portion. When the display device 1000 is tested with various shapes of the user's finger that directly contacts the display device 1000, a more accurate pressure value may be derived. Therefore, each of the pressing covers CV1, CV2, CV3, and CV4 may have a concave center (a), a convex center (b), or a shape (c) including one side that is flat and another side that is convex. According to an embodiment, the pressing covers CV1, CV2, CV3, and CV4 may be made of a silicon material.

According to an embodiment, some of the pressure sensors 510 and 520 disposed on a curved portion of the display device 1000 may have a length that occupies a portion (e.g., about 50%) of the display device 1000. As described above, the diameter of the protrusion 62 may be smaller than the diameter of the body 61, and the diameter of each of the pressing covers CV1, CV2, CV3, and CV4 engaged with the protrusions 62 may be smaller than the diameter of the body 61. In this case, there may occur a problem that a pressure cannot be uniformly applied to the pressure sensors 510 and 520.

For an accurate test of the display apparatus 1000, the pressing cover CV4 may have a rectangular parallelepiped shape and may have a length corresponding to about 50% of the display panel 1000.

Figure 6:
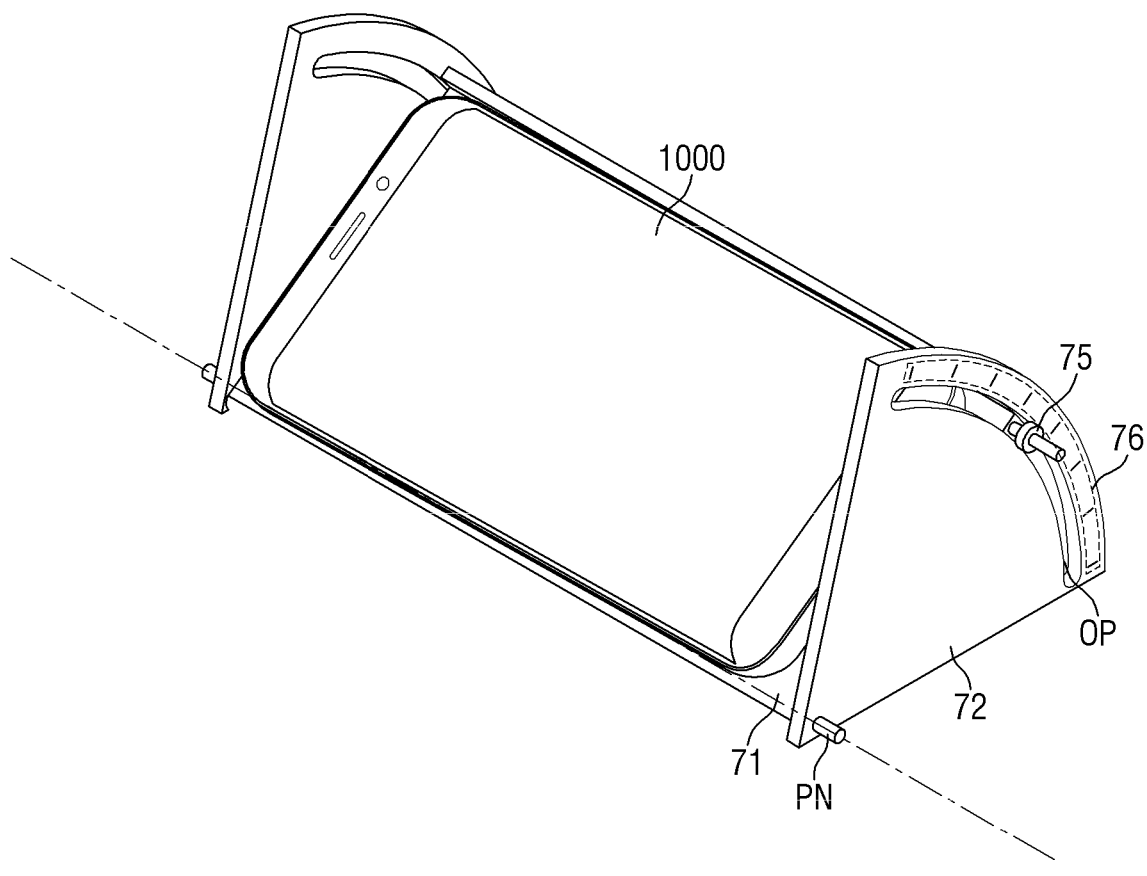
FIG. 6 is a perspective view showing a case where a display device is placed on a mounting portion included in an angle guide according to an embodiment.
Figure 7:
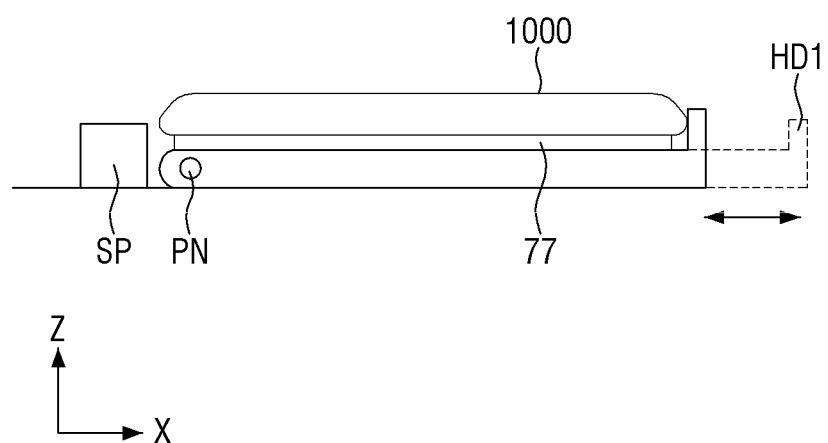
FIG. 7 is a cross-sectional view showing a case where a display device is placed on a mounting portion according to an embodiment.
Figure 8:
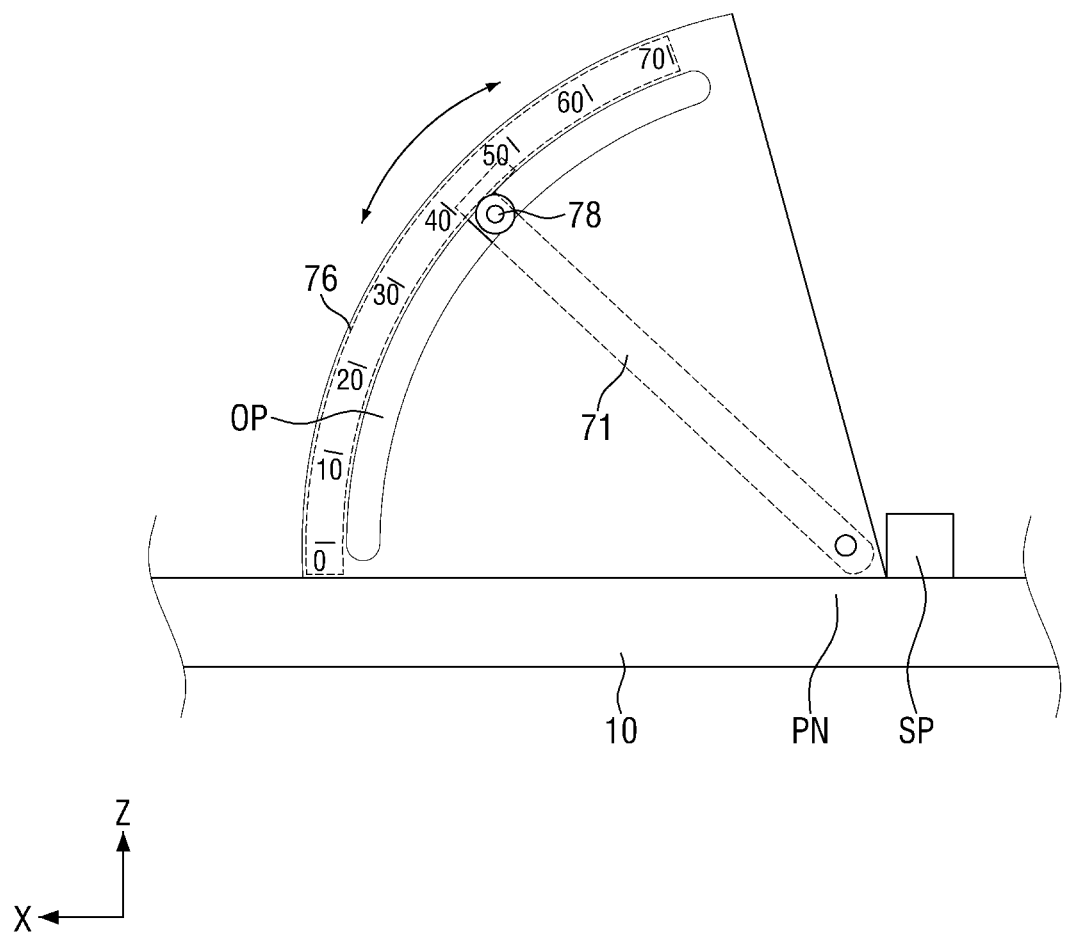
FIG. 8 is a side view of an angle guide according to an embodiment.
Figure 9:
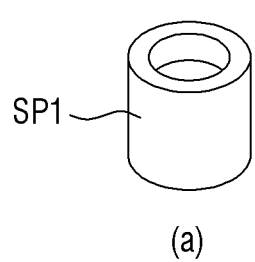
FIG. 9 is a perspective view of various supports according to an embodiment.
Figure 9:
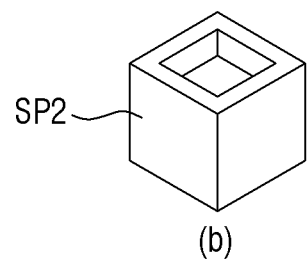
Figure 9:
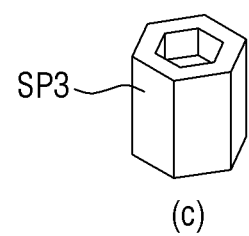
Figure 9:
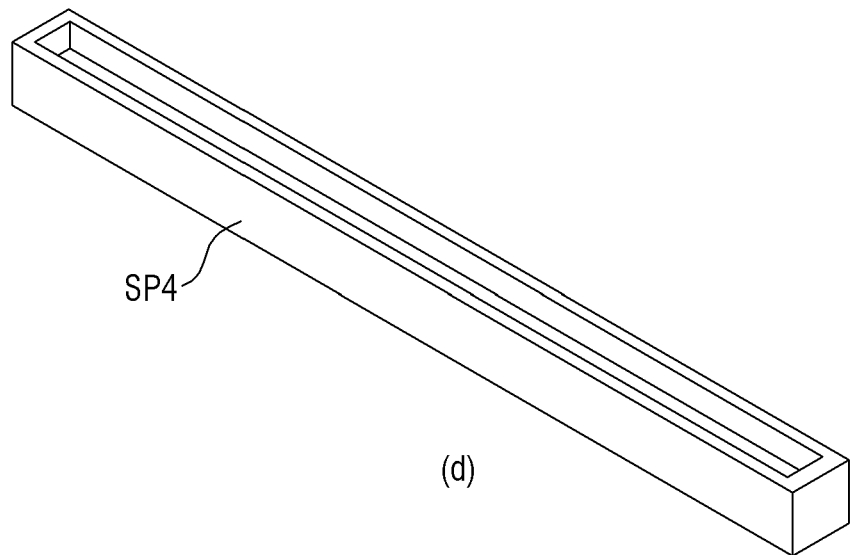

FIG. 6 is a perspective view showing a case where the display device 1000 is placed on a mounting portion included in an angle guide according to an embodiment, FIG. 7 is a cross-sectional view showing a case where the display device 1000 is placed on a mounting portion according to an embodiment, FIG. 8 is a side view of an angle guide according to an embodiment, and FIG. 9 is a perspective view of various supports according to an embodiment.

Referring to FIGS. 1, 2, and 6 to 8, the angle guide 70 may include a pair of angle adjusting portions 72 and a mounting portion 71. The pair of angle adjusting portions 72 may be a pair of plates having a predetermined thickness of a quadrant shape. The pair of angle adjusting portions 72 may be vertically formed on the stage 10 to face each other in the Y-axis direction. Each of the pair of angle adjusting portions 72 may include an opening OP (or an arc slot) formed along the outskirt of the quadrant and spaced apart from the outskirt by a predetermined distance. The periphery of the opening OP may include an indicator 76 that indicates an angle formed by an upper surface of the mounting portion 71 and an upper surface of the stage 10. Using the indicator 76, a test for the same point of the display device 1000 may be accurately and repeatedly performed. Although it is shown in FIG. 8 that the angle formed by the upper surface of the mounting portion 71 and the upper surface of the stage 10 is in a range of 0° to 70°, the present disclosure is not limited thereto. For example, the angle formed by the upper surface of the mounting portion 71 and the upper surface of the stage 10 may be in a range of 0° to 90°.

The mounting portion 71 may be a flat plate that supports the display device 1000. For example, the mounting portion 71 may be a rectangular plate. The surface area of the mounting portion 71 may be varied in proportion to the size of the display device 1000 to be mounted and tested. The mounting portion 71 may include a pin PN that extends in the Y-axis direction along one side surface of the mounting portion 71 and passes through holes formed in side surfaces of the pair of angle adjusting portions 72. A handle 75 may be formed on one side of the mounting portion 71, and a fixing member 78 may be formed on the other side of the mounting portion 71. The handle 75 of the mounting portion 71 may pass through the opening OP of one of the angle adjusting portions 72, and the fixing member 78 of the mounting portion 71 may pass through the opening OP of the other angle adjusting portion 72. The fixing member 78 may include a bolt and a nut, each of which is provided with threads. Therefore, the mounting portion 71 can be lifted and rotated with respect to the longitudinal axis of the pin PN to adjust the angle formed by the upper surface of the display device 1000 and the upper surface of the stage 10. After adjusting the angle of the mounting portion 71 to a desired angle, the display device may be fixed by using the fixing member 78.

The angle guide 70 may further include an anti-slip member 77 on the upper surface of the mounting portion 71, and the display device 1000 may be placed directly on the surface of the anti-slip member 77. When the angle formed by the mounting portion 71 and the upper surface of the stage 10 increases, the anti-slip member 77 may prevent the display device 1000 from slipping on the upper surface of the mounting portion 71.

The angle guide 70 may further include at least one support 73. Herein, the support 73 may also be referred to as a support SP. The support 73 may support one side of the display device 1000. The support 73 may securely place the display device 1000 preventing slip or displacement of the display device 1000 on the upper surface of the mounting portion 71 when the display device 1000 is rotated during the testing.

Referring to FIG. 9, the cross-sectional shape of the support 73 may have any one of a circle SP1, a square SP2, a regular octagon SP3, and a rectangle SP4 in a plan view. When the support 73 has a circular shape SP1 in a plan view, the support 73 may make a point contact with one side of the display device 1000. When the support 73 has any one shape of a square SP2, a regular octagon SP3, and a rectangle SP4 in a plan view, the support 73 may make a surface contact with one side of the display device 1000. When the support portion SP4 has a sufficiently long transverse length, it is possible to make a surface contact with the one side of the display device 1000 entirely. In the case of a surface contact as compared to a point contact, a weight may be more evenly distributed. Thus, the user may proceed to test various situations as if the display device 1000 is gripped. For example, a situation where the user grips the display device 1000 with two fingers may be tested with the support portion SP1 that has a circular shape in a plan view. Similarly, a situation where the user partially grips the display device 1000 with the palm of the hand may be tested with the rectangular support portion SP4 that has a sufficiently long horizontal length. The support 73 may be made of various materials, for example, plastics such as acetal or metals such as aluminum.

Referring to FIG. 7, the mounting portion 71 of the angle guide 70 may further include an extendable holder HD1. The extendable holder HD1 may include a damping rail RL. The extendable holder HD1 may be disposed on the side surface of the mounting portion 71 opposite to the side surface where the pin PN is disposed to extend the mounting portion 71, thereby increasing the size of the display device 1000 that can be firmly supported on the mounting portion 71.

Further, the height of the extendable holder HD1 may be sufficient to support the display device 1000. Thus, the extendable holder HD1 may not be placed on the curved surface portion of the display device 1000 where the pressure sensors 510 and 520 are disposed.

Hereinafter, the same reference numerals are used for the same components as those of the above-described embodiment. Hereinafter, redundant descriptions will be omitted, and differences are mainly described.

Figure 10:
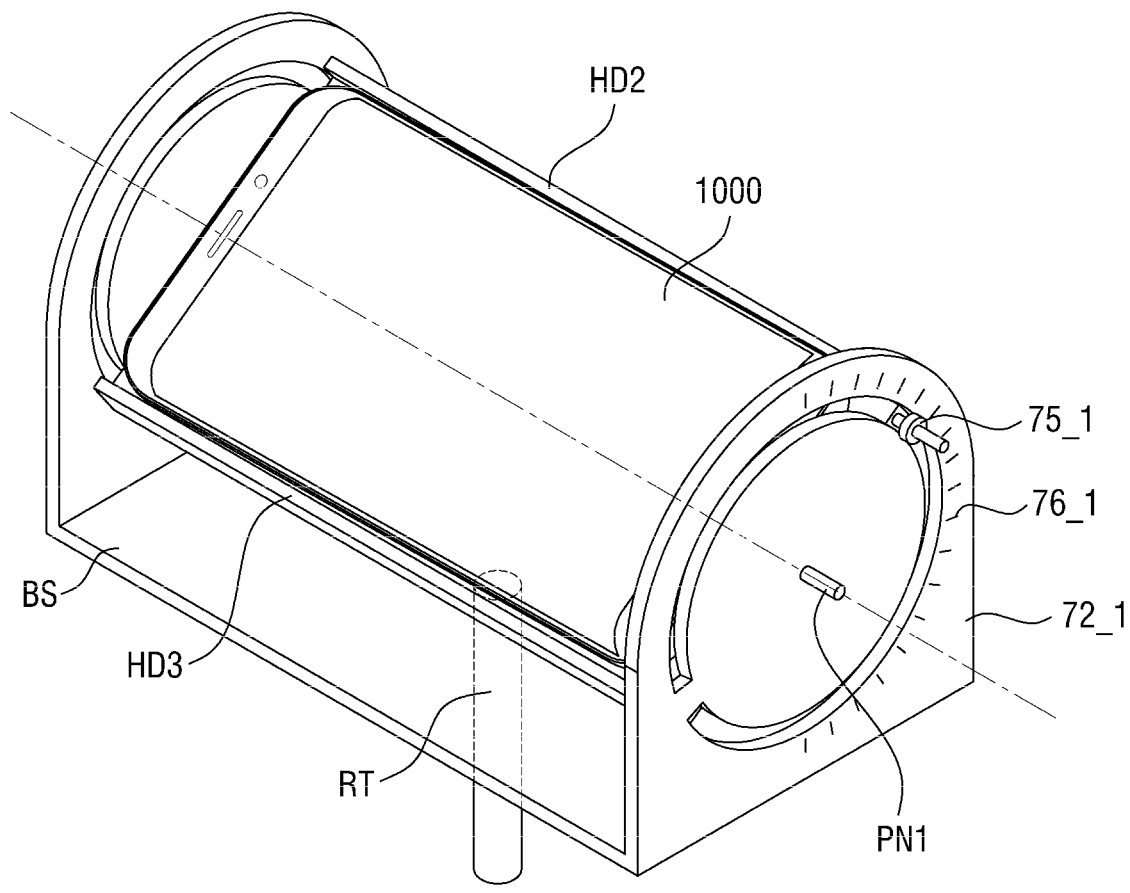
FIG. 10 is a perspective view showing a case where a display device is placed on a mounting portion included in an angle guide according to another embodiment.
Figure 11:
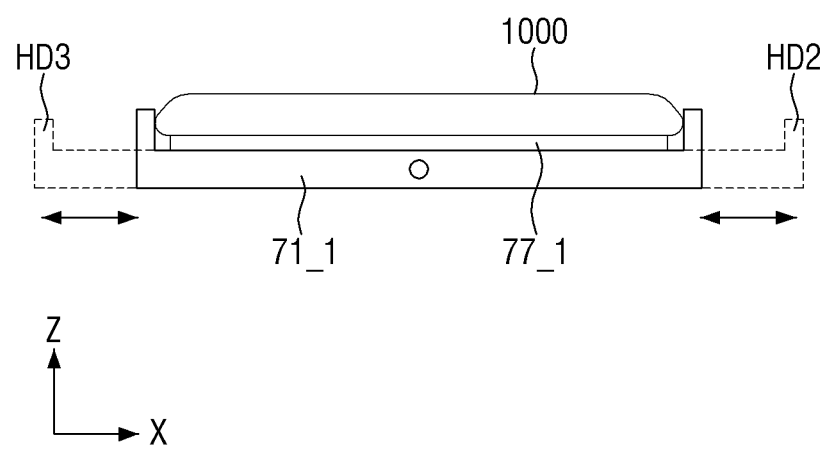
FIG. 11 is a cross-sectional view showing a case where a display device is placed on a mounting portion according to another embodiment.
Figure 12:
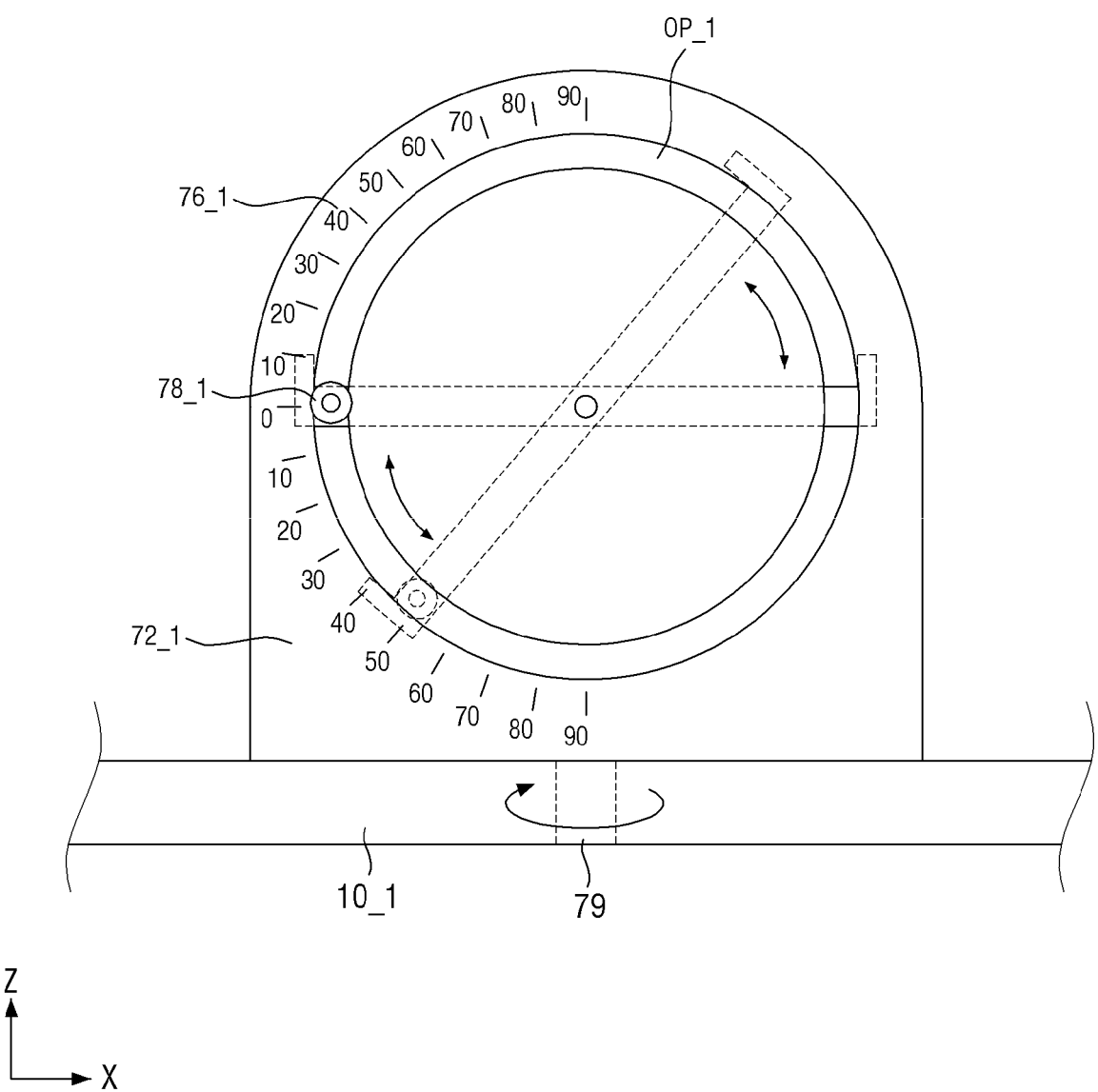
FIG. 12 is a side view of an angle guide according to another embodiment.

FIG. 10 is a perspective view showing a case where a display device is placed on a mounting portion included in an angle guide according to another embodiment, FIG. 11 is a cross-sectional view showing a case where a display device is placed on a mounting portion according to another embodiment, and FIG. 12 is a side view of an angle guide according to another embodiment.

Referring to FIGS. 10 to 12, an angle guide 70_1 according to another embodiment is different from the angle guide 70 in that a mounting portion 71_1 is rotated with respect to a line having the same distance from one side surface and the other side surface of the mounting portion 71_1 as a center axis to adjust the angle formed by the upper surface of the display device 1000 and the upper surface of a stage 10_1. In addition, the angle guide 70_1 may further include a rotating member 79 capable of rotating 360° with respect to the Z-axis.

More specifically, the angle guide 70_1 according to another embodiment may include a pair of angle adjusting portions 72_1, the mounting portion 71_1, and the rotating member 79. The pair of angle adjusting portions 72_1 may be a pair of plates having a predetermined thickness of a circular shape and a flat bottom side. The pair of angle adjusting portions 72_1 may be vertically formed on the stage 10_1 to face each other in the Y-axis direction. Each of the pair of angle adjusting portions 72_1 may include an opening OP_1 (or a circular slot) formed along the outskirt of the circle and spaced apart from the outskirt by a predetermined distance. The periphery of the opening OP_1 may include an indicator 76_1 that indicates an angle formed by an upper surface of the mounting portion 71_1 and an upper surface of the stage 10_1. Using the indicator 76_1, a test for the same point of the display device 1000 may be accurately and repeatedly performed. Although it is shown in FIGS. 10 and 12 that the opening OP_1 has a circular shape, the present disclosure is not limited thereto. For example, the opening OP_1 may have a semi-circular shape.

The mounting portion 71_1 may be a flat plate that supports the display device 1000. For example, the mounting portion 71_1 may be a rectangular plate. The surface area of the mounting portion 71_1 may be varied in proportion to the size of the display device 1000 to be mounted and tested. The mounting portion 71_1 may include a pin PN1 that extends in the Y-axis direction through the center of the opening OP_1. Each of the pair of angle adjusting portions 72_1 may include a hole at the center to correspond to the pin PN1 of the mounting portion 71_1. The pin PN1 of the mounting portion 71_1 is inserted into the holes of the pair of angle adjusting portions to rotatably engage the mounting portion 71_1 and the angle adjusting portion 72_1 with each other. A handle 75_1 may be formed on one side of the mounting portion 71_1, and a fixing member 78_1 may be formed on the other side of the mounting portion 71_1. The handle 75_1 of the mounting portion 71_1 may pass through the opening OP1 of one of the angle adjusting portions 72_1, and the fixing member of the mounting portion 71_1 may pass through the opening OP1 of the other angle adjusting portion 72_1. The fixing member 78_1 may include a bolt and a nut, each of which is provided with threads. Therefore, the angle guide 70_1 can rotate the mounting portion 71_1 with respect to the longitudinal axis of the pin PN1 to adjust the angle formed by the upper surface of the display device 1000 and the upper surface of the stage 10_1. After adjusting the angle of the mounting portion 71_1 to a desired angle, the display device 1000 may be fixed using the fixing member 78_1.

The angle guide 70_1 may further include an anti-slip member 77_1 on the upper surface of the mounting portion 71_1, and the display device 1000 may be placed directly on the surface of the anti-slip member 77_1. When the angle formed by the mounting portion 71_1 and the upper surface of the stage 10_1 increases, the anti-slip member 77_1 may prevent the display device 1000 from slipping on the upper surface of the mounting portion 71_1.

Referring to FIG. 11, the mounting portion 71_1 of the angle guide 70_1 may further include extendable holders HD2 and HD3 on both sides thereof. Each of the extendable holders HD2 and HD3 may include a damping rail RL. The extendable holders HD2 and HD3 may be disposed on both sides of the mounting portion 71_1 to extend the mounting portion 71_1, thereby increasing the size of the display device 1000 that can be supported on the mounting portion 71_1 In addition, the display device 1000 may be firmly supported by the mounting portion 71_1 even when the upper surface of the display device 1000 is turned upside down to face the upper surface of the stage 10_1. Further, the height of each of the holders HD2 and HD3 may be sufficient to support the display device 1000. Thus, the extendable holders HD2 and HD3 may not be placed on the curved surface portion of the display device 1000 where the pressure sensors 510 and 520 are disposed.

The pair of angle adjusting portions 72_1 of the angle guide 70_1 may be formed on a base BS disposed on the stage 10_1. The rotating member 79 may be included on the lower surface of the base BS. The rotating member 79 may engage the base BS and the stage 10_1 with each other rotatably 360° in a plan view. For example, the rotating member 79 having a shaft member at the center of the lower surface of the base BS may be disposed, and a shaft hole may be disposed at a portion of the stage 10_1 to couple the shaft member to the base BS. The base BS may rotate 180° rotating the angle guide 70_1, and the mounting portion 71_1 may ascend or descend without dismounting the display device 1000 from the mounting portion 71_1, thereby performing a test procedure on both sides of the display device 1000.

Figure 13:
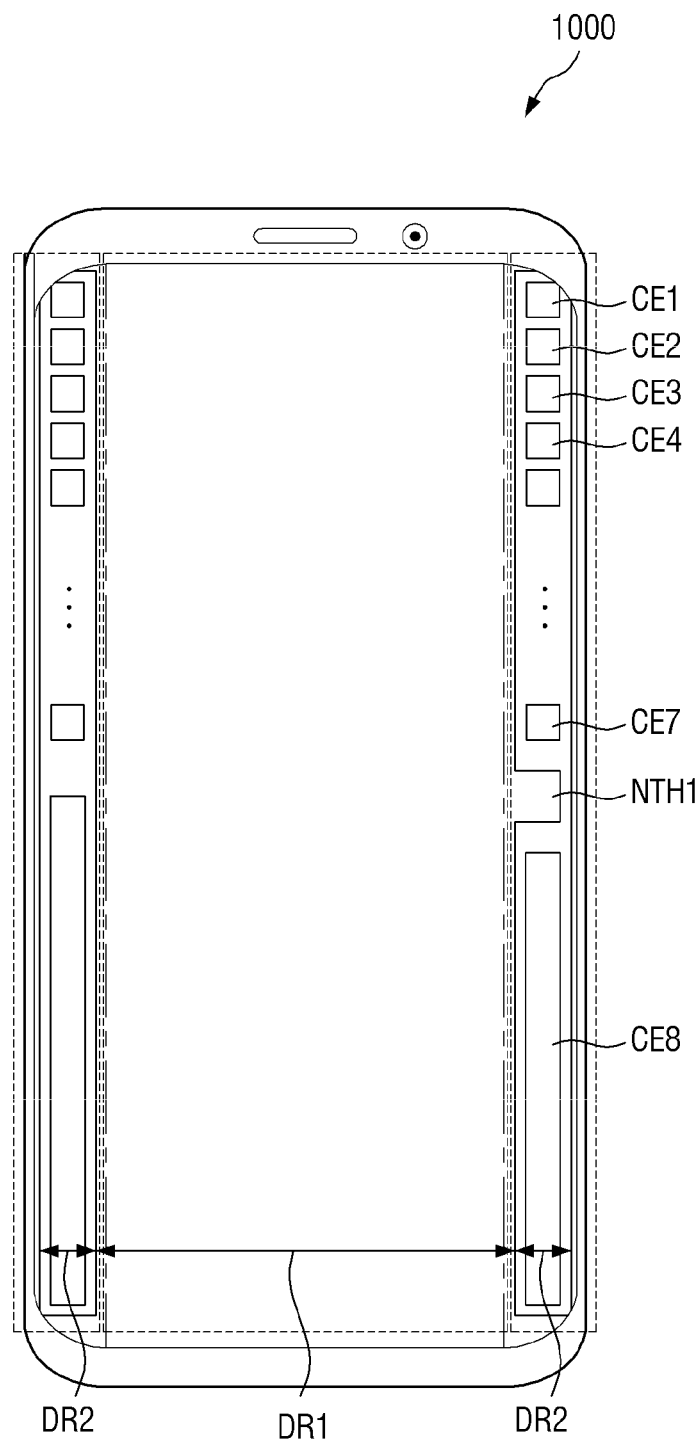
FIG. 13 is a perspective view showing a pressure sensor mounted on a display device according to an embodiment.
Figure 14:
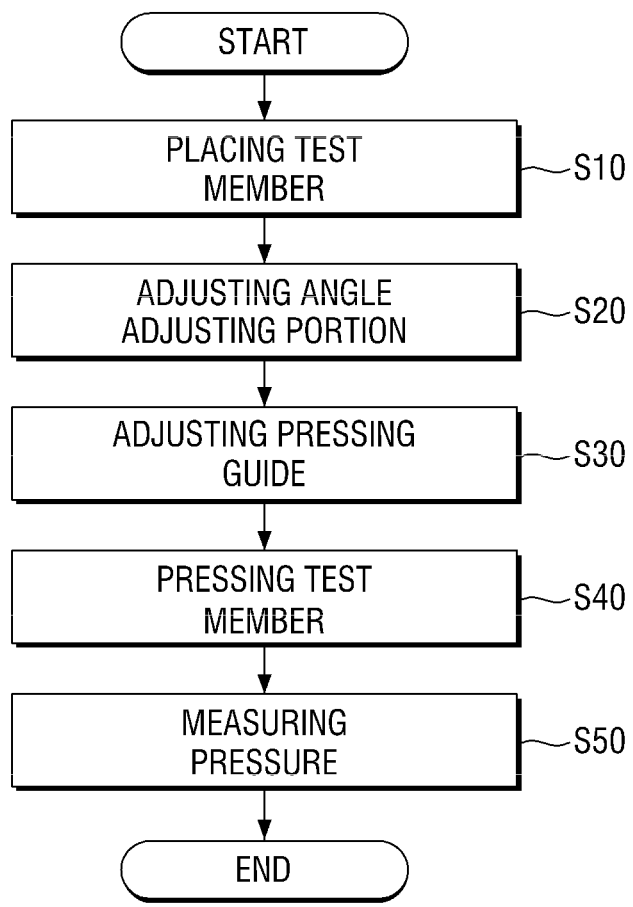
FIG. 14 is a diagram sequentially showing a method of testing a display device using a test apparatus according to an embodiment.
Figure 15:
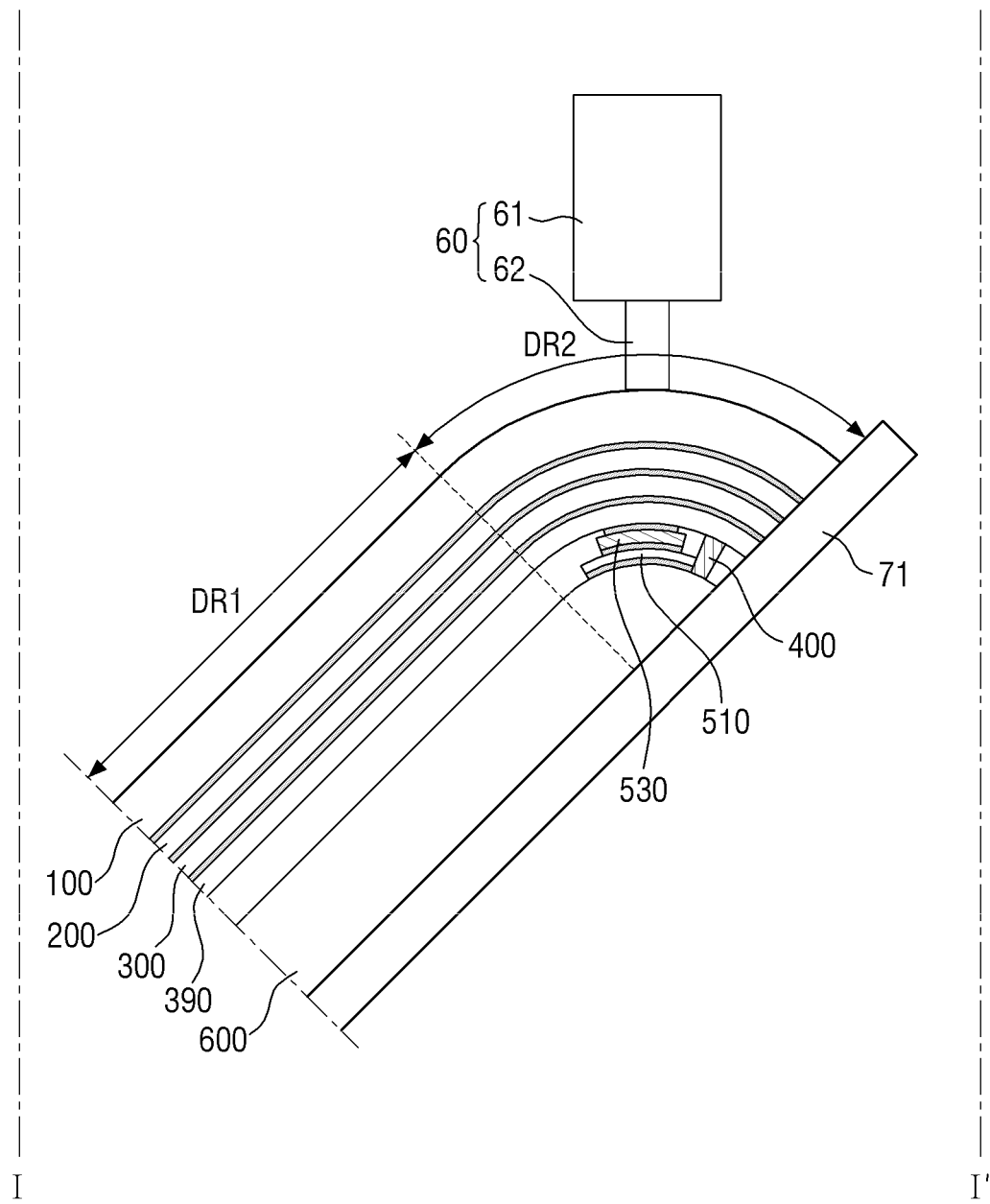
FIG. 15 is a conceptual view showing a method of testing a pressure sensor included in a display device using a test apparatus according to an embodiment.

Hereinafter, a method of testing a display device through the aforementioned test apparatus will be described. FIG. 13 is a perspective view showing a pressure sensor mounted on a display device according to an embodiment, FIG. 14 is a diagram sequentially showing a method of testing a display device using a test apparatus according to an embodiment, and FIG. 15 is a conceptual view showing a method of testing a pressure sensor included in a display device using a test apparatus according to an embodiment.

Referring to FIG. 13, the display device 1000 may have a substantially rectangular shape with round edges in a plan view. For example, as shown in FIG. 13, the display device 1000 may have a rectangular planar shape having short sides in the first direction (e.g., the X-axis direction) and long sides in the second direction (e.g., the Y-axis direction). The edges where the short side in the first direction (X-axis direction) meets the long side in the second direction (Y-axis direction) may have a round shape of a predetermined curvature or a right angle shape. However, the planar shape of the display device 1000 is not limited to a rectangular shape, and may be formed in a polygonal shape, a circular shape, or an elliptical shape.

The display device 1000 may include a first area DR1 that has a flat planar shape and a second area DR2 that extends from the left and right sides of the first area DR1. The second area DR2 may be flat or curved. When the second area DR2 is formed to be flat, the angle formed by the first area DR1 and the second area DR2 may be an obtuse angle. When the second area is formed to be curved, the second area DR2 may have a constant curvature or a variable curvature.

Although it is shown in FIG. 13 that the second area DR2 extends from the left and right sides of the first area DR1, the present disclosure is not limited thereto. That is, the second area DR2 may extend from only one of the left and right sides of the first area DR1. In addition, the second area DR2 may extend from one or more of the upper and lower sides of the first area DR1 as well as one or more of the left and right sides of the first area DR1. Hereinafter, an example in which the second area DR2 is disposed along the left and right edges of the display device 1000 will be described.

At the upper half of the second area DR2, the pressure sensor 520 may be formed of a plurality of pressure sensing cells. The plurality of pressure sensing cells may be disposed along the long side of the second direction (Y-axis direction). For example, eight channels (or eight pairs of pressure sensing cells) may be formed to have a length corresponding to about 50% of the long side.

At the lower half of the second area DR2, the pressure sensor 520 may have an elongated shape. For example, the eighth pressure sensing cell CE8 may be disposed along the long side of the second direction (Y-axis direction), and one channel corresponding to the eighth pressure sensing cell CE8 may be formed to have a length corresponding to about 50% of the long side. However, the present disclosure is not limited thereto. At least one lower half of the left or right second area DR2, a second pressure sensor may be formed of a plurality of pressure sensing cells as well. For example, the pressure sensors 510 and 520 may refer to the pressure sensors that are disposed along the left and right long sides of the display device 1000 in the length direction, and two or more channels (not shown) may be formed to have a length corresponding to about 50% of the long side.

Referring to FIGS. 14 and 15, a method of testing a testing member includes the steps of: placing the test member on an angle guide 70 (S10); adjusting an angle of the angle guide 70 (S20); adjusting positions of pressing guide to correspond to measured positions of the testing member (S30); engaging a pressing member 60 to the pressing guide and pressing the testing member (S40); and measuring the pressure (S50). Although the method of testing the testing member is described with respect to the angle guide 70 illustrated in FIGS. 1, 2, and 6, it is understood that the method of testing the testing member can be equally applied to the angle guide 70_1 illustrated in FIGS. 10 to 12.

First, the pressing guide may move to their respective zero point positions. Here, the zero point position refers to a position where each of the first slide member 20, the second slide member 30, and the third slide member 40 is held to prevent the interference caused by the pressing guide in the process of placing the test member on the mounting portion 70 of the angle guide 70. For example, the first slide member 20 may be located at the left end in the Y-axis direction, the second slide member 30 may be located at the uppermost end in the Z-axis direction, and the third slide member 40 may be located at the most rear end in the X-axis direction.

Next, the test member is placed on the mounting portion 71 of the angle guide 70. The test member may be, for example, the display device 1000. For example, the display device 1000 may be located at the center of the mounting portion 71. According to an embodiment, the angle guide 70 may include at least one support 73. In this case, one side of the display device 1000 may be placed on the mounting portion 71 to directly contact the support 73 to support the display device 1000. According to another embodiment, the angle guide 70 may include a pair of holders on both sides of the mounting portion 71.

Next, the angle of the mounting portion 71 of the angle guide 70 is adjusted by rotating the angle guide 70. In this case, the angle formed by the upper surface of the mounting portion 71 and the upper surface of the stage 10 may be adjusted such that a virtual tangent line to a cover glass of the display device 1000 is orthogonal to an imaginary longitudinal axis of the pressing member 60. According to an embodiment, a user of the test apparatus 1 may adjust the angle using the handle 75 of the mounting portion 71, and may fix the mounting portion 71 by tightening the nut of the fixing member 78 disposed on the opposite side.

Next, the pressing guide are adjusted such that the protrusion 62 of the pressing member 60 is located at a test position of the display device 1000. The first slide member 20 may move left and right to adjust the Y-axis test position of the display device 1000, and the third slide member 40 may move up and down to adjust the Y-axis test position of the display device 1000. Further, the guide arm 50 may move in the downward direction (i.e., the Z-axis direction) such that the center of the guide ring 52 to be engaged to the pressing member 60 is located to overlap the target coordinate of the display device 1000.

Next, one or more pressing members 60 may be inserted into the guide ring 52 to press the display device 1000. In this case, the pressing members 60 corresponding to the interval of −10% to +10% based on a magnitude of the pressure at which the pressure sensors 510 and 520 start to operate may be sequentially inserted in an order. The above range and interval of the pressing members 60 is not limited to this, and may be, for example, −20% to +20% based on the magnitude of the pressure at which the pressure sensors 510 and 520 start to operate.

Next, when pressure is applied to the display device 1000 through the pressing member 60, the pressure is measured through the pressure sensors 510 and 520. When the pressing member 60 is inserted into the guide ring 52, the weight correction according to the contact between the guide ring 52 and the pressing member 60 may be required. For example, when using an electronic balance for weight correction, the weight of the pressing member 60 alone is measured, and a difference between two measured values may be obtained by measuring the weight of the pressing member 60 again while the pressing member 60 is supported by the guide ring 52. Weight correction may be performed by using the pressing member 60 that is weighted by the difference between the two measured weight values.

Figure 16:
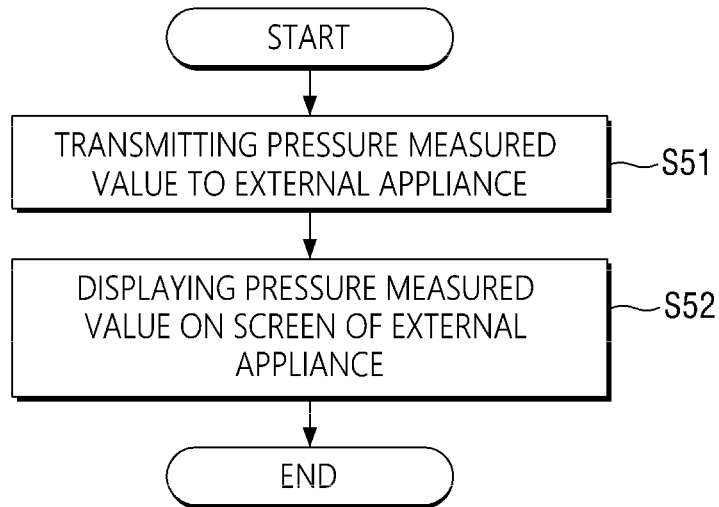
FIG. 16 is a diagram showing a method of processing pressure value information measured through a pressure sensor according to an embodiment.

FIG. 16 is a diagram showing a method of processing pressure value information measured through a pressure sensor according to an embodiment.

Referring to FIG. 16, the display device 1000 may transmit pressure measurement value information acquired through the pressure sensors 510 and 520 to an external appliance (S51). According to another embodiment, the display device 1000 may internally process the pressure measurement value information. The display device 1000 may include a screen, a touch sensor, the pressure sensors 510 and 520, a memory, a communication device, and a controller 710. The communication device is configured to perform communication with various types of external appliances according to various communication protocols. The communication device may include a wireless communication chip, a Wi-Fi chip, a Bluetooth chip, a near-field communication (NFC) chip, and a Zigbee chip. According to an embodiment, the controller 710 may transmit the pressure measurement value information acquired by the pressure sensors 510 and 520 to the external appliance via the Bluetooth protocol. However, the communication protocol is not limited thereto, and other communication protocols such as Wi-Fi, NFC, and Zigbee may be used.

Each of the Wi-Fi chip and the Bluetooth chip can perform communication using the Wi-Fi protocol and the Bluetooth protocol, respectively. When the Wi-Fi chip or the Bluetooth chip is used, various connection information necessary for establishing the communication such as an SSID and a session key may need to be transmitted and received first. The wireless communication chip refers to a chip that performs communication according to various communication standards such as IEEE, ZigBee, 3rd Generation (3G), 3rd Generation Partnership Project (3GPP), and Long Term Evolution (LTE). The NFC chip may operate in an NFC mode using a frequency band of 13.56 MHz among various RF-ID frequency bands such as 135 kHz, 13.56 MHz, 433 MHz, 860 to 960 MHz and 2.45 GHz.

Next, the external appliance may display the received pressure measurement value information on the screen (S52).

According to an embodiment, the pressure measurement information may be represented as a relative value to a reference value at which the pressure sensors 510 and 520 start to operate. For example, the display device 1000 is pressed by the pressing member 60 having a weight of 250 gram to apply a pressure at which the pressure sensors 510 and 520 start to operate. When the magnitude of the pressure measured by the pressure sensors 510 and 520 corresponds to the 200 gram force, the amount of pressure on the screen of the external appliance may be displayed as 80. In contrast, when the magnitude of the pressure measured by the pressure sensors 510 and 520 is a 300 gram force, the amount of pressure on the screen of the external appliance may be displayed as 120.

Further, when a test is performed on the plurality of pressure sensors 510 and 520 included in the display device 1000, the controller 710 of the external appliance may display a result on the screen as to whether or not the respective pressure sensors 510 and 520 are normal. According to an embodiment, the controller 710 may determine whether the pressure sensors 510 and 520 operate normally when the controller 710 acquires a relative value corresponding to 90 to 110 as compared with the magnitude of the pressure at which the pressure sensors 510 and 520 start to operate, and may show the result in a window indicating a normal state. In contrast, the controller 710 may determine whether the pressure sensors 510 and 520 operate abnormally when the controller 710 acquires a relative value not corresponding to 90 to 110 as compared with the magnitude of the pressure at which the pressure sensors 510 and 520 start to operate, and may show the result in a window indicating an abnormal state. The range of a normal operation is not limited thereto. For example, it may be determined that the pressure sensors 510 and 520 operate normally when the controller 710 acquires a relative value corresponding to 80 to 120 as compared with the magnitude of the pressure at which the pressure sensors 510 and 520 start to operate.

Hereinafter, the display device 1000 for storing pressure information obtained through the aforementioned method of testing the display device 1000 and correcting the pressure values sensed by the pressure sensors 510 and 520 will be described. The specific configuration of the display device 1000 will be described later, and for convenience, will be described using the following reference numerals.

Figure 17:
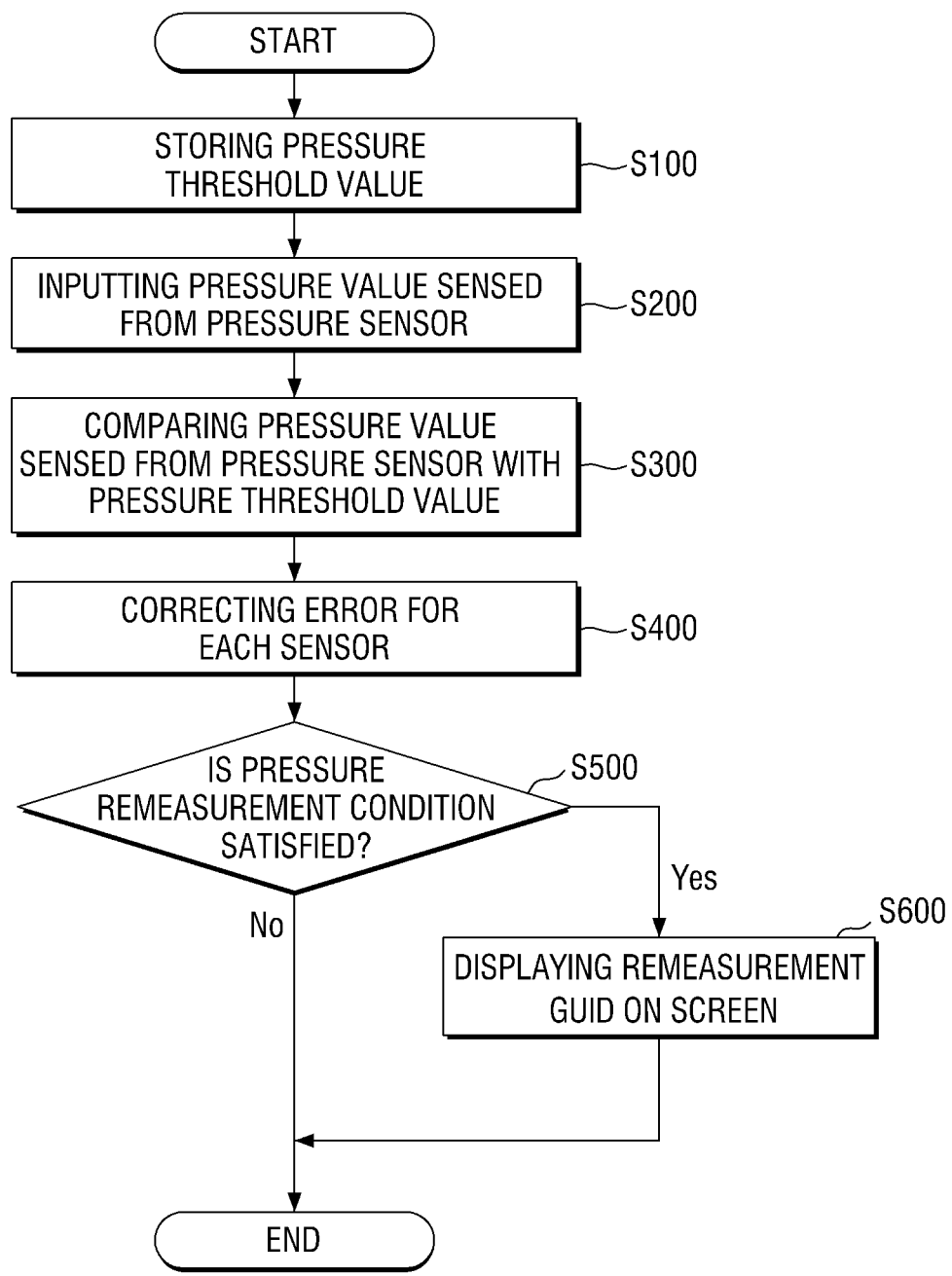
FIG. 17 is a flowchart showing a process of correcting a sensitivity deviation of a plurality of pressure sensors having different sensitivities.

FIG. 17 is a flowchart showing a process of correcting a sensitivity deviation of a plurality of pressure sensors having different sensitivities.

Referring to FIG. 17, the process in which the controller 710 corrects the sensitivity deviation of the pressure sensors 510 and 520 includes the steps of: storing a pressure threshold value of the pressure sensors 510 and 520 measured by the test apparatus 1 of the display device 1000 (S100); inputting the pressure values sensed by the pressure sensors 510 and 520 (S200); comparing the pressure values with the pressure threshold value (S300); and correcting an error for each of the pressure sensors 510 and 520, for example, the sensitivity deviation for each of the plurality of pressure sensing cells included in the pressure sensor (S400).

The controller 710 may store the pressure threshold value obtained through the test apparatus 1 of the display device 1000 in a storage (S100). In this case, the pressure threshold value may be defined as a magnitude of the pressure at which the pressure sensors 510 and 520 start to operate. The pressure threshold value may be obtained by detecting a pressure value at which the pressure sensors 510 and 520 start to operate, when the amount of the pressure applied to the display device 1000 is sequentially changed.

Next, the controller 710 may receive the pressure values sensed through the pressure sensors 510 and 520 (S200). According to an embodiment, when applying the same pressure to a plurality of pressure sensing cells, the respective pressure sensing cells may sense different amounts of pressure. When the pressure sensing cell senses a relatively large amount of pressure as compared with the same pressure, the pressure sensing cell may be referred to as a sensitive pressure sensing cell. In contrast, when the pressure sensing cell senses a relatively small amount of pressure as compared with the same pressure, the pressure sensing cell may be referred to as a dull pressure sensing cell.

Next, the controller 710 may compare the pressure value sensed by the pressure sensor with the pressure threshold value (S300). The controller 710 may calculate the sensitivity deviation of the pressure sensing cells included in the display device 1000 by comparing the sensed pressure value and the pressure threshold value for each of the plurality of pressure sensors 510 and 520.

Next, the controller 710 may correct the sensitivity deviation of the plurality of pressure sensing cells (S400). The controller 710 may calculate a weighted value based on the amount of pressure sensed by the pressure sensing cell. The controller 710 may assign a weighted value for adjusting the sensitivity down to a sensitive pressure sensing cell that senses a relatively large amount of pressure with respect to the same pressure. In contrast, the controller 710 may assign a weighted value for adjusting the sensitivity up to a dull pressure sensing cell that senses a relatively small amount of pressure with respect to the same pressure. When a specific pressure is applied to the pressure sensing cell that is assigned with the weighted value, the controller 710 may determine that the pressure is normally sensed. Since the plurality of pressure sensing cells having different sensitivities can sense the substantially same pressure amount with respect to the same pressure, reliability of pressure sensing can be improved.

Further, the controller 710 may determine whether or not pressure re-measurement conditions are satisfied (S500). When the controller 710 determines that the pressure re-measurement conditions are satisfied, the controller 710 may display a window for guiding the re-measurement on the screen (S600). Various re-measurement conditions may exist. First, there may be a case where a pressure exceeding a predetermined range is applied to the display device 1000 in comparison with the pressure threshold value of the pressure sensor 510 or 520 due to dropping of the pressing member 60 or the like. Second, there may be a case where a period arbitrarily set by a user expires. According to an embodiment, the sensitivity of the pressure sensing cells may decrease as the time of use elapses. Third, there may be a case where a pressure is applied to the pressure sensors 510 and 520 more than a preset number of times. That is, the user may press the display device 1000 a plurality of times when the pressure sensors 510 and 520 do not start to operate in response to a normal pressure. When the sensitivity of the pressure sensors 510 and 520 is corrected according to the re-measurement guidance, the sensing function of the pressure sensors 510 and 520 may be normally maintained.

Figure 18:
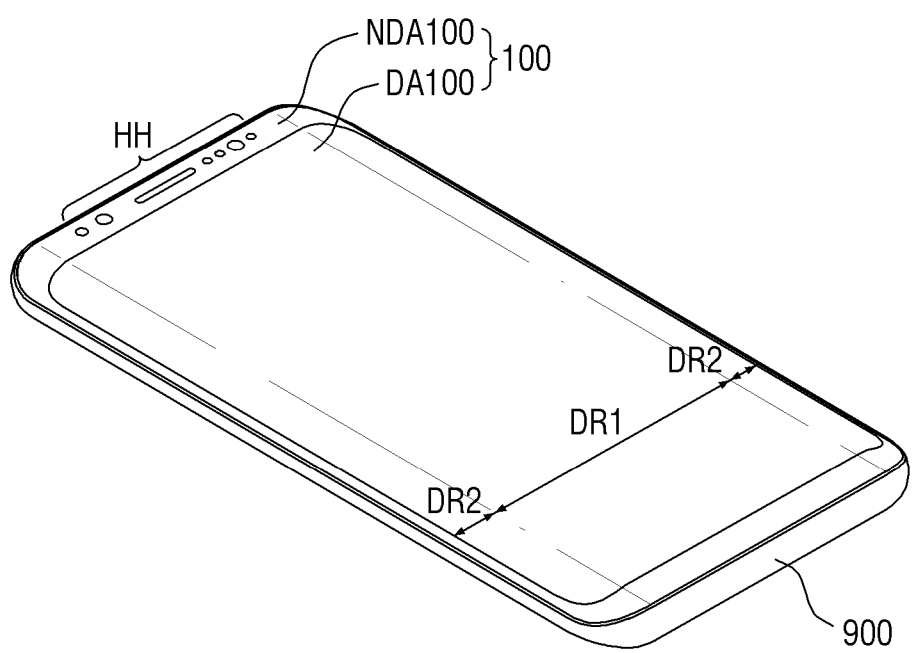
FIG. 18 is a perspective view of a display device according to an embodiment.
Figure 19:
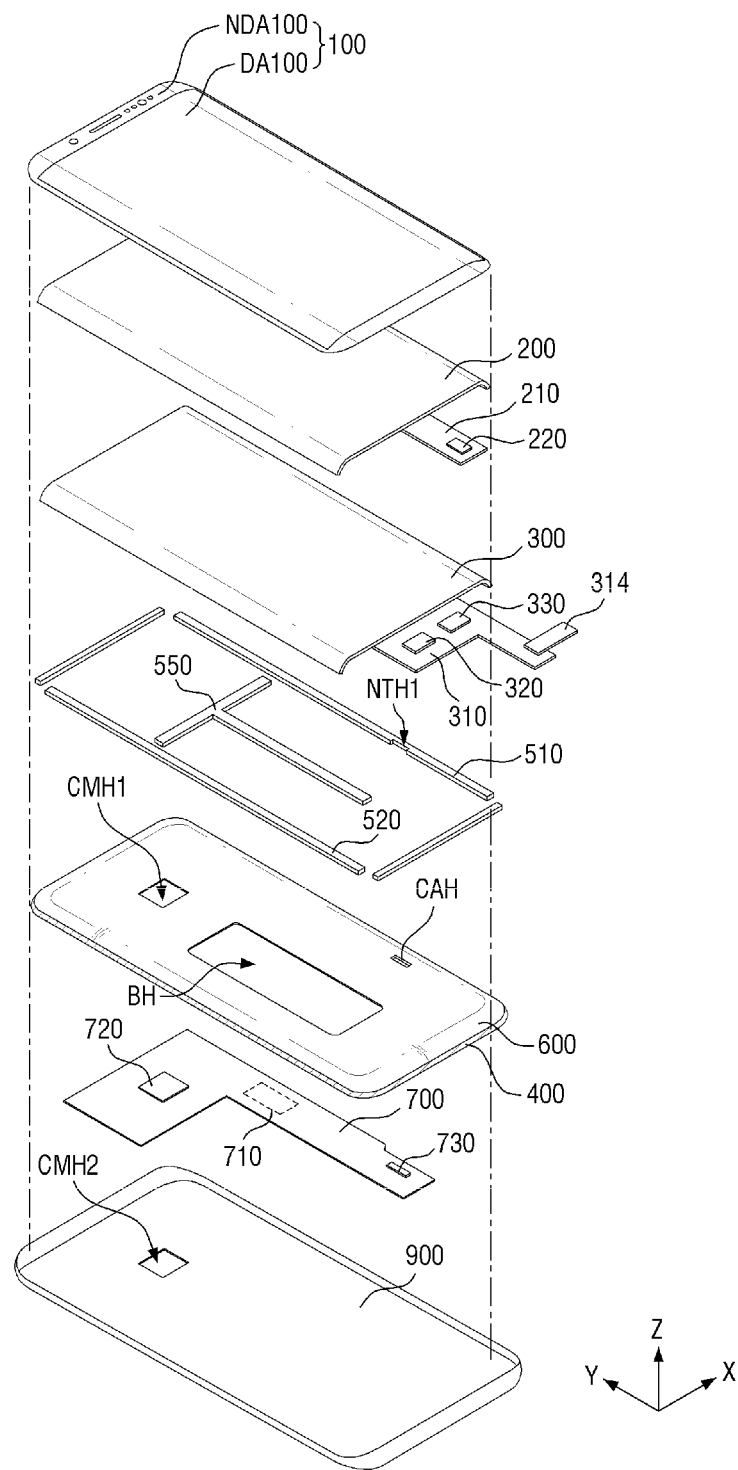
FIG. 19 is an exploded perspective view of a display device according to an embodiment.

Hereinafter, the configuration of the above-described display device will be described in detail. FIG. 18 is a perspective view of a display device according to an embodiment. FIG. 19 is an exploded perspective view of a display device according to an embodiment.

Referring to FIGS. 18 and 19, a display device according to an embodiment includes a cover window 100, a touch sensor 200, a touch circuit board 210, a touch driver 220, a display panel 300, a display circuit board 310, a display driver 320, a pressure sensor 330, a first pressure sensor 510, a second pressure sensor 520, a pressure sensing circuit board 550, a middle frame 600, a main circuit board 700, and a lower cover 900.

In this specification, the term "on", "over", "top", "upper side", or "upper surface" refers to a direction in which the cover window 100 is disposed, that is, the Z-axis direction, with respect to the display panel 300, and the term "beneath", "under", "bottom", "lower side", or "lower surface" refers to a direction in which a middle is frame 600 is disposed, that is, a direction opposite to the Z-axis direction, with respect to the display panel 300. Further, the terms "left", "right", "upper", and "lower" refer to directions when the display panel 300 is viewed from a plane. For example, the "left" refers to a direction opposite to the X-axis direction, the "right" refers to the X-axis direction, the "upper" refers to the Y-axis direction, and the "lower" refers to a direction opposite to the Y-axis direction.

The display device 1000 may have a rectangular shape in a plan view. For example, as shown in FIGS. 18 and 19, the display device 1000 may have a rectangular planar shape having short sides in the first direction (e.g., the X-axis direction) and long sides in the second direction (e.g., the Y-axis direction). The edges where the short side in the first direction (X-axis direction) meets the long side in the second direction (Y-axis direction) may be have a round shape of a predetermined curvature or a right angle shape. However, the planar shape of the display device 1000 is not limited to a rectangular shape, and may be formed in a polygonal shape, a circular shape, or an elliptical shape.

The display device 1000 may include a first area DR1 that has a flat planar shape and a second area DR2 that extends from the left and right sides of the first area DR1. The second area DR2 may be flat or curved. When the second area DR2 is formed to be flat, the angle formed by the first area DR1 and the second area DR2 may be an obtuse angle. When the second area is formed to be curved, the second area DR2 may have a constant curvature or a variable curvature.

Although it is shown in FIG. 18 that the second area DR2 extends from the left and right sides of the first area DR1, the present disclosure is not limited thereto. That is, the second area DR2 may extend from only one of the left and right sides of the first area DR1. In addition, the second area DR2 may extend from one or more of the upper and lower sides of the first area DR1 as well as one or more of the left and right sides of the first area DR1. Hereinafter, an example in which the second area DR2 is disposed along the left and right edges of the display device 1000 will be described.

Figure 24:
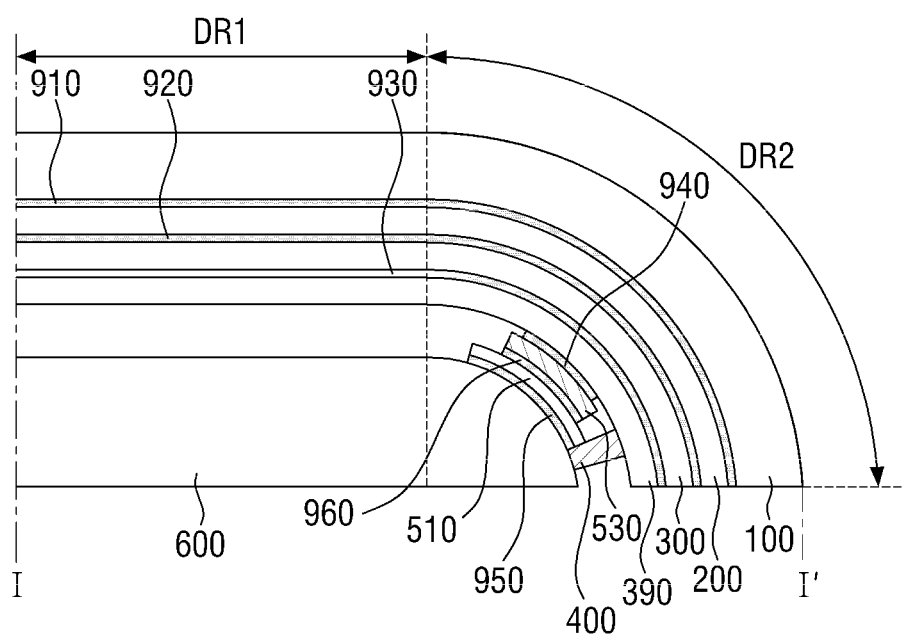
FIG. 24 is a cross-sectional view showing an example of a display device.

The cover window 100 may be disposed on the display panel 300 to cover the upper surface of the display panel 300. Thus, the cover window 100 may protect the upper surface of the display panel 300. The cover window 100 may be attached to the touch sensor 200 through a first adhesive member 910 as shown in FIG. 24. The first adhesive member 910 may be an optically clear adhesive (OCA) film or an optically clear resin (OCR) film.

The cover window 100 may include a light transmitting area DA100 that corresponds to the display panel 300 and a light blocking area NDA100 that corresponds to an area other than the display panel 300. The cover window 100 may be disposed in the first area DR1 and the second area DR2, and the light transmitting area DA100 may correspond to a portion of the first area DR1 and a part of the second area DR2. The light blocking area NDA100 may be opaque. Alternatively, the light blocking area NDA100 may be formed as a decorative layer having a pattern that can be seen to a user although an image is not displayed therein. For example, a company logo such as "SAMSUNG" or various characters may be patterned in the light blocking area NDA100. Further, the light blocking area NDA100 may be provided with a plurality of holes HH for exposing a front camera, a front speaker, an infrared sensor, an iris recognition sensor, an ultrasonic sensor, an illuminance sensor, or the like, but the present disclosure is not limited thereto. For example, some or all of the front camera, the front speaker, the infrared sensor, the iris recognition sensor, the ultrasonic sensor, and the illuminance sensor may be mounted in the display panel 300. In this case, some or all of the plurality of holes HH may be omitted.

The cover window 100 may be made of glass, sapphire, and/or plastic. The cover window 100 may be rigid or flexible.

The touch sensor 200 may be disposed between the cover window 100 and the display panel 300. The touch sensor 200 may be disposed to overlap the first area DR1 and the second area DR2. The touch sensor 200 may sense a user's touch in the second area DR2 as well as the first area DR 1.

The touch sensor 200 may be attached to the lower surface of the cover window 100 through the first adhesive member 910. According to one embodiment, a polarizing film may be provided on the touch sensor 200 to prevent the deterioration of visibility due to the reflection of external light. In this case, the polarizing film may be attached to the lower surface of the cover window 100 through the first adhesive member 910.

The touch sensor 200 can sense a touch position of a user, and may be implemented as a capacitive type such as a self-capacitance type or a mutual capacitance type. When touch sensor 200 is implemented as a self-capacitive type, the touch sensor 200 may include only touch driving electrodes, but when the touch sensor 200 is implemented as a mutual capacitance type, the touch sensor 200 may include both touch driving electrodes and touch sensing electrodes. Hereinafter, the touch sensor 200 implemented as a mutual capacitance type will be described.

The touch sensor 200 may be a panel type or a film type. The touch sensor 200 may be attached onto a thin encapsulation layer of the display panel 300 through a second adhesive member 920 as shown in FIG. 24. The second adhesive member 920 may be an optically clear adhesive (OCA) film or an optically clear resin (OCR) film.

According to one embodiment, the touch sensor 200 may be formed integrally with the display panel 300. In this case, the touch driving electrodes and the touch sensing electrodes of the touch sensor 200 may be disposed on the thin encapsulation layer of the display panel 300.

The touch circuit board 210 may be attached to one side of the touch sensor 200. Specifically, the touch circuit board 210 may be attached onto pads provided on one side of the touch sensor 200 using an anisotropic conductive film. Further, the touch circuit board 210 may be provided with a touch connection portion (not shown), and the touch connection portion may be connected to a touch connector (not shown) of the display circuit board 310. The touch circuit board 210 may be a flexible printed circuit board.

The touch driver 220 may apply touch driving signals to the touch driving electrodes of the touch sensor 200, sense sensing signals from the touch sensing electrodes of the touch sensor 200, and may further analyze the sensing signals to calculate a touch position of the user. The touch driver 220 may be formed as an integrated circuit and mounted on the touch circuit board 210.

The display panel 300 may be disposed under the touch sensor 200. The display panel 300 may be disposed to overlap the light transmitting area DA100 of the cover window 100. The display panel 300 may be disposed in the first area DR1 and the second area DR2. Thus, the image of the display panel 300 may be seen in both the first area DR1 and the second area DR2.

The display panel 300 may be a light emitting display panel including a light emitting element. Examples of the display panel 300 may include an organic light emitting display panel using an organic light emitting diode (OLED), an ultra-small light emitting diode display panel using a micro LED, or a quantum dot light emitting diode display panel using a quantum dot light emitting diode (QLED).

The display panel 300 may include a substrate, and a thin film transistor layer, a light emitting element layer, and the thin film encapsulation layer that are disposed on the substrate.

Since the display panel 300 is implemented to have flexibility, the display panel 300 may be formed of plastic. In this case, the substrate may include a flexible substrate and a support substrate. The support substrate is used to support the flexible substrate, and the support substrate may have lower flexibility than the flexible substrate. For example, each of the flexible substrate and the support substrate may include polyethersulphone (PES), polyacrylate (PA), polyarylate (PAR), polyetherimide (PEI), polyethylenenapthalate (PEN), polyethylene terepthalate (PET), polyphenylenesulfide (PPS), polyallylate, polyimide (PI), polycarbonate (PC), cellulosetriacetate (CAT), cellulose acetate propionate (CAP), or any combination thereof.

The thin film transistor layer is disposed on the substrate. The thin film transistor layer may include scan lines, data lines, and thin film transistors. Each of the thin film transistors includes a gate electrode, a semiconductor layer, and source and drain electrodes. When a scan driver (not shown) is formed directly on the substrate, the scan driver may be formed together with the thin film transistor layer.

The light emitting element layer is disposed on the thin film transistor layer. The light emitting element layer may include anode electrodes, a light emitting layer, a cathode electrode, and banks. The light emitting layer may include an organic light emitting layer containing an organic material. For example, the light emitting layer may include a hole injection layer (HIL), a hole transporting layer (HTL), an organic light emitting layer, an electron transporting layer (ETL), and an electron injection layer (EIL). The hole injection layer and the electron injection layer may be omitted. When voltages are applied to the anode electrodes and the cathode electrodes, holes and electrons are transferred to the organic light emitting layer through the hole transporting layer and the electron transporting layer, respectively, and the holes and electrons are combined with each other in the organic light emitting layer to emit light. The light emitting element layer may include a pixel array layer in which a plurality of pixels are formed, and the area where the light emitting element layer is formed may be defined as a display area for displaying an image. The area around the display area may be defined as a non-display area.

The thin film encapsulation layer is disposed on the light emitting element layer. The thin film encapsulation layer serves to prevent oxygen or moisture from penetrating into the light emitting element layer. The thin film encapsulation layer may include at least one inorganic film and at least one organic film.

The display circuit board 310 may be attached to one side of the display panel 300. Specifically, the display circuit board 310 may be attached to pads provided at one side of the display panel 300 using an anisotropic conductive film. The touch circuit board 210 may also be bent to the lower surface of the display panel 300, and the touch connection portion disposed at one end of the touch circuit board 210 may be connected to the touch connector of the display circuit board 310.

The display driver 320 outputs signals and voltages for driving the display panel 300 through the display circuit board 310. The display driver 320 may be formed as an integrated circuit and mounted on the display circuit board 310, but the present disclosure is not limited thereto. For example, the display driver 320 may be directly mounted on the substrate of the display panel 300, and, in this case, the display driver 320 may be attached to the upper surface or lower surface of the substrate of the display panel 300.

A panel lower member 390 may be disposed under the display panel 300 as shown in FIG. 24. The panel lower member 390 may be attached to the lower surface of the display panel 300 through a third adhesive member 930. The third adhesive member 930 may be an optically clear adhesive (OCA) film or an optically clear resin (OCR) film.

The panel lower member 390 may include at least one of a light absorbing member for absorbing external light, a buffer member for absorbing an external impact, a heat dissipating member for efficiently dissipating heat of the display panel 300, and a light blocking layer for blocking external light.

The light absorbing member may be disposed under the display panel 300. The light absorbing member may inhibit transmission of light to prevent layers and components disposed under the light absorbing member including the first pressure sensor 510, the second pressure sensor 520, the display circuit board 310, and the like from being viewed from above the display panel 300. The light absorbing member may include a light absorbing material such as a black pigment or a dye.

The buffer member may be disposed under the light absorbing member. The buffer member may absorb an external impact to prevent the display panel 300 from being damaged. The buffer member may be composed of a single layer or a plurality of layers. For example, the buffer member may be formed of a polymer resin such as polyurethane, polycarbonate, polypropylene, or polyethylene, or may be formed of an elastic material such as a rubber, a urethane material, or a sponge formed by foaming an acrylic material. The buffer member may also be referred to as a cushion layer.

The heat dissipating member may be disposed under the buffer member. The heat dissipating member may include a first heat dissipating layer including graphite or carbon nanotubes and a second heat dissipating layer capable of blocking electromagnetic waves and formed of a metal thin film of copper, nickel, ferrite or silver that has excellent thermal conductivity.

The pressure sensor 500 may include the first pressure sensor 510 and the second pressure sensor 520. The first pressure sensor 510 and the second pressure sensor 520 may be disposed in the second area DR2. For example, the first pressure sensor 510 may be disposed under the display panel 300 at the right edge of the display panel 300. The second pressure sensor 520 may be disposed under the display panel 300 at the left edge of the display panel 300. The first pressure sensor 510 and the second pressure sensor 520 may be disposed to face each other in the first direction (X-axis direction).

The first pressure sensor 510 and the second pressure sensor 520 may be attached to the lower surface of the panel lower member 390. The first pressure sensor 510 and the second pressure sensor 520 may be connected to the display circuit board 310 through the pressure sensing circuit board 550. The first pressure sensor 510 and the second pressure sensor 520 may be connected to one pressure sensing circuit board 550, but the present disclosure is not limited thereto. The first pressure sensor 510 and the second pressure sensor 520 may be connected to the display circuit board 310 through different pressure sensing circuit boards 550.

The pressure sensor 330 for sensing pressure by the first pressure sensor 510 and the second pressure sensor 520 may be mounted on the display circuit board 310. In this case, the pressure sensor 330 may be formed as an integrated circuit. The pressure sensor 330 may be integrated with the display driver 320 to form a single integrated circuit.

Alternatively, the pressure sensing circuit board 550 may be connected to the touch circuit board 210 rather than the display circuit board 310. In this case, the pressure sensor 330 may be mounted on the touch circuit board 210. The pressure sensor 330 may be integrated with the touch driver 220 to form a single integrated circuit.

The middle frame 600 may be disposed under the panel lower member 390. The middle frame 600 may include a synthetic resin, a metal, or a combination of a synthetic resin and a metal.

A waterproofing member 400 may be disposed at the edge of the middle frame 600. The waterproofing member 400 may be disposed outside the first pressure sensor 510 and the second pressure sensor 520. The waterproofing member 400 may be attached to the upper surface of the panel lower member 390 and the lower surface of the middle frame 600.

According to the embodiment shown in FIGS. 18 and 19, the waterproofing member 400 is disposed outside the first pressure sensor 510 and the second pressure sensor 520 to prevent water or dust from penetrating between the display panel 300 and the middle frame 600. That is, a waterproof and dustproof display device 1000 may be provided as a waterproof and dustproof display device.

The middle frame 600 may be provided with a first camera hole CMH1 through which a camera device 720 is disposed, a battery hole BH through which heat is discharged from a battery (not shown), and a cable hole CAH through which a second connection cable 314 that is connected to the display circuit board 310 passes. Specifically, the cable hole CAH may be disposed at a right edge of the middle frame 600, and the cable hole CAH may be shrouded by the first pressure sensor 510 that is disposed under the panel lower member 390 at the right edge of the display panel 300. The first pressure sensor 510 may include a first concave portion NTH1 that is formed concavely in a notch shape at one side of the first pressure sensor 510 to expose the cable hole CAH without being shrouded.

Further, the middle frame 600 may be disposed under the panel lower member 390 of the display panel 300, the first pressure sensor 510, and the second pressure sensor 520. When a pressure is applied to the first pressure sensor 510 and the second pressure sensor 520, the middle frame 600 may support the first pressure sensor 510 and the second pressure sensor 520. Accordingly, the first pressure sensor 510 and the second pressure sensor 520 may sense the applied pressure.

The main circuit board 700 may be disposed under the middle frame 600. The main circuit board 700 may be a printed circuit board or a flexible printed circuit board.

The main circuit board 700 may include the controller 710, the camera device 720, and a main connector 730. The controller 710 and the main connector 730 may be disposed on the lower surface of the main circuit board 700, facing the lower cover 900. The camera device 720 may be disposed on the upper surface of the main circuit board 700 at a position corresponding to the first camera hole CMH1.

The controller 710 may control various functions of the display device 1000. For example, the controller 710 may output image data to the display driver 320 of the display circuit board 310 such that the display panel 300 displays an image. Further, the controller 710 may receive touch data from the touch driver 220, determine a touch position of a user, and execute an application indicated by an icon displayed on the display panel 300 at the touch position of the user. Further, the controller 710 may receive pressure sensing data from the touch driver 220 or the display driver 320, and may control the display device 1000 to output a home screen, control the volume of the sound of the display device 1000, or to implement a haptic interface. The controller 710 may be an application processor, a central processing unit (CPU), or a system chip that includes an integrated circuit. The controller 710 may be referred to as a main processor.

The main circuit board 700 may further include a storage for storing pressure values of the pressure sensors 510 and 520 that may be measured through an external test apparatus and/or a pressure threshold value that may be obtained by the pressure values. The storage may be a register or a non-volatile memory. In this case, the controller 710 may determine whether a pressure is applied by comparing the pressure value sensed by the pressure sensors 510 and 520 with the pressure threshold value.

The camera device 720 may process an image frame such as a still image or a moving image obtained by an image sensor in a camera mode, and outputs the processed image frame to the controller 710.

The second connection cable 314 that has passed through the cable hole CAH of the middle frame 600 may be connected to the main connector 730 disposed on the lower surface of the main circuit board 700 through a gap between the middle frame 600 and the main circuit board 700. Thus, the main circuit board 700 may be electrically connected to the display circuit board 310 and the touch circuit board 210.

In addition, the main circuit board 700 may be further provided with a mobile communication module that is capable of transmitting and receiving radio signals to/from at least one of a base station, an external terminal, and a server. The radio signals may include various types of data depending on a voice signal, a video call signal, or a text/multimedia message. Further, the main circuit board 700 may be further provided with an acoustic output device that is capable of outputting sound and a vibration device that is capable of generating vibration for providing a haptic interface.

The lower cover 900 may be disposed under the middle frame 600 and the main circuit board 700. The lower cover 900 may be engaged and fixed to the middle frame 600. The lower cover 900 may correspond to a lower surface of the display device 1000. The lower cover 900 may include plastic and/or metal.

The lower cover 900 may be provided with a second camera hole CMH2 through which the camera device 720 is inserted to protrude outwardly. It is understood that the position of the camera device 720 and the positions of the first and second camera holes CMH1 and CMH2 corresponding to the camera device 720 are not limited to the embodiment shown in FIGS. 18 and 19.

The vibration device may be disposed on the upper surface of the lower cover 900, and may be connected to the main circuit board 700. The vibration device may generate vibration in response to a vibration signal received from the controller 710. The vibration device may be any one of an eccentric rotating motor (ERM), a linear resonant actuator (LRA), and a piezoelectric actuator.

Figure 20:
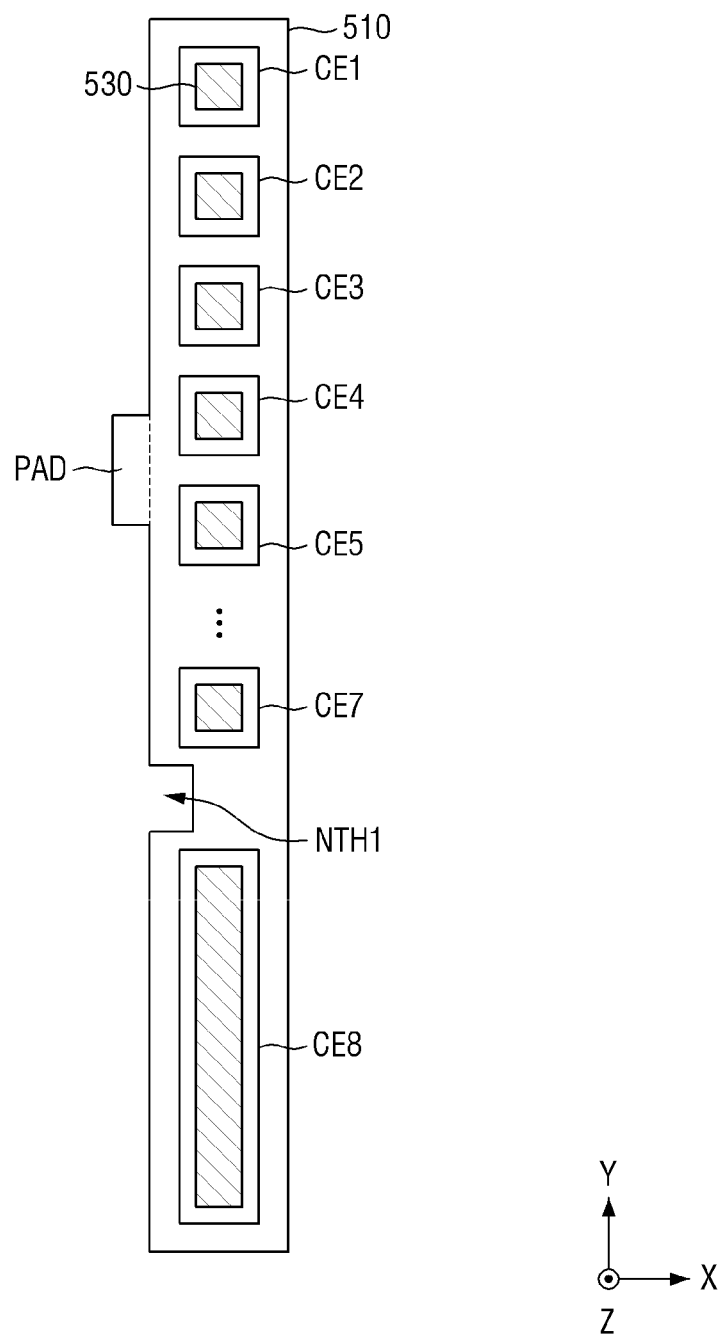
FIG. 20 is a plan view showing a first pressure sensor and first bumps according to an embodiment.

FIG. 20 is a plan view showing a first pressure sensor and first bumps according to an embodiment.

Referring to FIG. 20, the first pressure sensor 510 may have a rectangular planar shape having short sides in the first direction (X-axis direction) and long sides in the second direction (Y-axis direction). However, the planar shape of the first pressure sensor 510 is not limited thereto, and may vary depending on a placement position in the display device 1000.

The first pressure sensor 510 may include a plurality of pressure sensing cells CE1 to CE8. It is illustrated in FIG. 20 that the first pressure sensor 510 includes eight pressure sensing cells CE1 to CE8, but the number of pressure sensing cells is not limited thereto.

Each of the pressure sensing cells CE1 to CE8 may independently sense a pressure at the corresponding position. Although it is illustrated in FIG. 20 that the pressure sensing cells CE1 to CE8 are arranged in a row or a column, the present disclosure is not limited thereto. The pressure sensing cells CE1 to CE8 may be arranged in a plurality of rows or columns. The respective pressure sensing cells CE1 to CE8 may be arranged to be spaced apart from each other at predetermined intervals as shown in FIG. 20, or may be arranged continuously.

The pressure sensing cells CE1 to CE8 may have different shapes and areas depending on an application. For example, the first to seventh pressure sensing cells CE1 to CE7 may be used as physical buttons such as volume control buttons VB+ and VB− or power buttons PB disposed on the edge of one side of the display device 1000. The eighth pressure sensing cell CE8 may be used as a button SQB for sensing an amount of squeezing pressure of a user. In this case, the eighth pressure sensing cell CE8 may be formed to have a larger area than each of the first to seventh pressure sensing cells CE1 to CE7. For example, the eighth pressure sensing cell CE8 may be formed longer than each of the first to seventh pressure sensing cells CE1 to CE7 in the length direction (Y-axis direction) of the first pressure sensor 510.

Although the first to seventh pressure sensing cells CE1 to CE7 used as physical buttons are shown to have the same area in FIG. 20, the present disclosure is not limited thereto. That is, the areas of the first to seventh pressure sensing cells CE1 to CE7 may be different from each other. In some embodiments, some of the first to seventh pressure sensing cells CE1 to CE7 may have a first area while the rest of the first to seventh pressure sensing cells CE1 to CE7 may have a second area that is different from the first area.

The first bumps 530 may be disposed on the first to eighth pressure sensing cells CE1 to CE8 to overlap the first to eighth pressure sensing cells CE1 to CE8. The first bumps 530 may serve to press the first to eighth pressure sensing cells CE1 to CE8 according to a pressure applied by a user. Therefore, the pressure applied by the user may be sensed by the first to eighth pressure sensing cells CE1 to CE8.

To increase sensitivity of the pressure applied to the first to eighth pressure sensing cells CE1 to CE8 by the first bumps 530, each of the first bumps 530 may be formed to have a smaller area than each of the first to eighth pressure sensing cells CE1 to CE8. Each of the first bumps 530 may be formed to have a smaller area than a pressure sensing layer PSL of each of the first to eighth pressure sensing cells CE1 to CE8.

The area of the first bump 530 may be proportional to the area of the corresponding pressure sensing cell. For example, as shown in FIG. 20, the area of the eighth pressure sensing cell CE8 is larger than the area of each of the first to seventh pressure sensing cells CE1 to CE7, therefore the area of the first bump 530 that overlaps the eighth pressure sensing cell CE8 may be larger than the area of each of the first bumps 530 that overlap the first to seventh pressure sensing cells CE1 to CE7.

The first concave portion NTH1 having a notch shape may be formed in an area corresponding to the cable hole CAH of the frame 600 in the first pressure sensor 510 not to cover the cable hole CAH of the middle frame 600.

Figure 21:
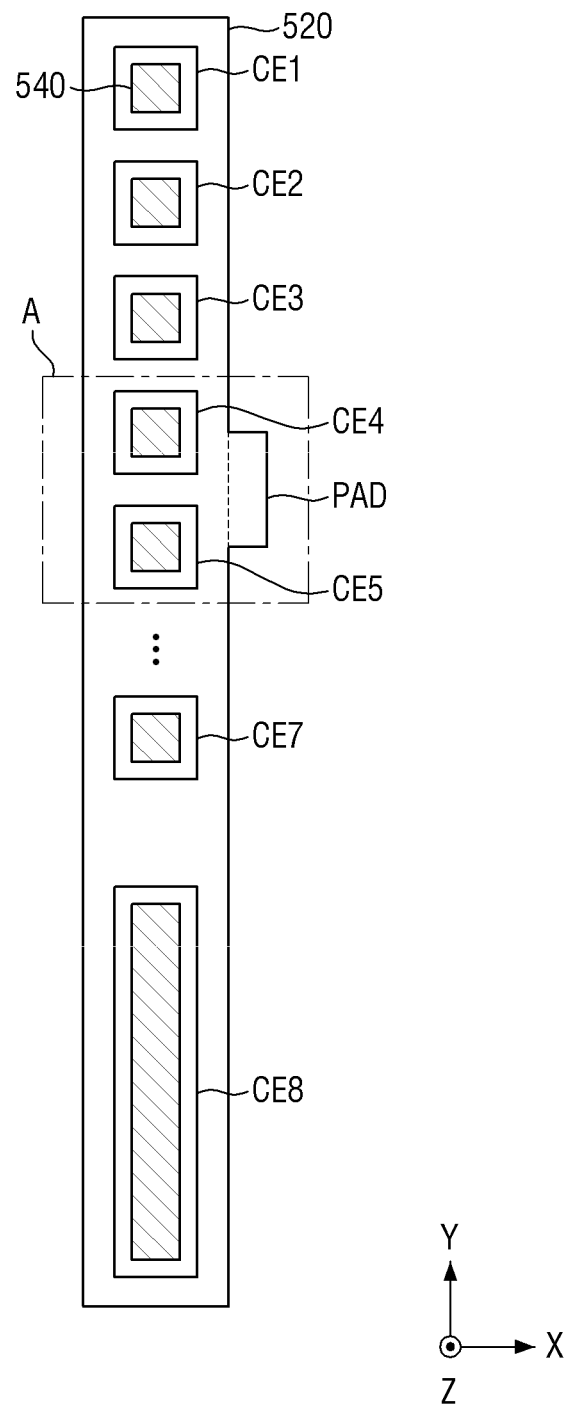
FIG. 21 a plan view showing a second pressure sensor and second bumps according to an embodiment.

The second pressure sensor 520 and the second bumps 540 shown in FIG. 21 are different from the first pressure sensor 510 and the first bumps 550 shown in FIG. 20 in that the second pressure sensor 520 includes a pad region PAD instead of the concave portion NTH1. Therefore, a detailed description of the second pressure sensor 520 and the second bumps 540 that is commonly applicable to the first pressure sensor 510 and the first bumps 530 will be omitted.

Figure 22:
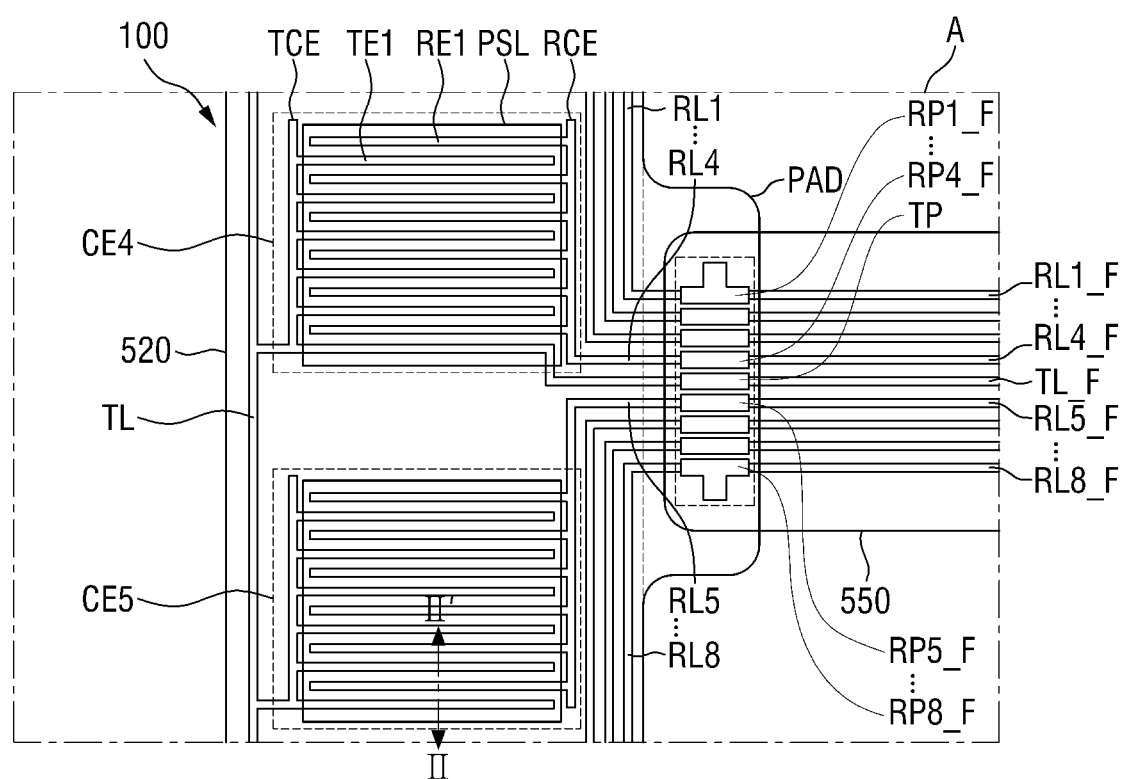
FIG. 22 is a plan view showing an area of FIG. 21 in detail.
Figure 22:
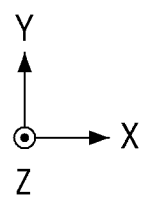
Figure 23:
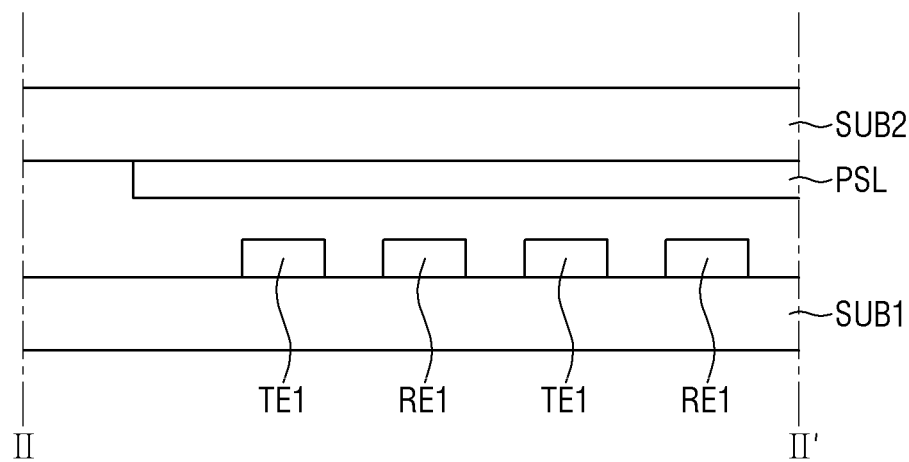
FIG. 23 is a cross-sectional view showing an example of II-II' of FIG. 22.
Figure 23:
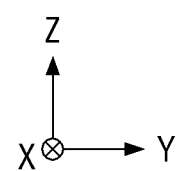

FIG. 22 is a plan view showing the area A of FIG. 21 in detail. FIG. 23 is a cross-sectional view showing an example of II-II' of FIG. 22.

Referring to FIGS. 22 and 23, the first pressure sensor 510 includes a first substrate SUB1, a second substrate SUB2, a driving line TL, first to eighth sensing lines RL1 to RL8, a driving pad TP, first to eighth sensing pads RP1 to RP8, and first to eighth pressure sensing cells CE1 to CE8.

For convenience of explanation, FIG. 22 shows the fourth pressure sensing cell CE4, the fifth pressure sensing cell CE5, and the pad region PAD. Further, for convenience of explanation, FIG. 22 omits the second substrate SUB2.

The first substrate SUB1 and the second substrate SUB2 are disposed to face each other in the Z-axis direction. Each of the first substrate SUB1 and the second substrate SUB2 may include polyethylene, polyimide, polycarbonate, polsulfone, polyacrylate, polystyrene, polyvinyl chloride, polyvinyl alcohol, polynorbonene, or polyester. In an embodiment, each of the first substrate SUB1 and the second substrate SUB2 may be formed of a polyethylene terephthalate (PET) film or a polyimide film.

The pressure sensing cells CE1 to CE8 are arranged between the first substrate SUB1 and the second substrate SUB2. The driving line TL, the sensing lines RL1 to RL8, the driving pad TP, and the sensing pads RP1 to RP8 may be arranged on one surface of the first substrate SUB1 facing the second substrate SUB2.

Each of the pressure sensing cells CE1 to CE8 may be connected to at least one driving line and at least one sensing line. For example, the pressure sensing cells CE1 to CE8 may be commonly connected to one driving line TL, whereas they may be connected one-to-one to the sensing lines RL1 to RL8. As shown in FIG. 22, the fourth pressure sensing cell CE4 may be connected to the driving line TL and the fourth sensing line RL4, and the fifth pressure sensing cell CE5 may be connected to the driving line TL and the fifth sensing line RL5.

The driving line TL may be connected to the driving pad TP, and the sensing lines RL1 to RL8 may be connected one to one to the sensing pads RP1 to RP8. The first sensing line RL1 may be connected to the first sensing pad RP1, the second sensing line RL2 may be connected to the second sensing pad RP2, the third sensing line RL3 may be connected to the third sensing pad RP3, and the fourth sensing line RL4 may be connected to the fourth sensing pad RP4. Similarly, the fifth sensing line RL5 may be connected to the fifth sensing pad RP5, the sixth sensing line RL6 may be connected to the sixth sensing pad RP6, the seventh sensing line RL7 may be connected to the seventh sensing pad RP7, and the eighth sensing line RL8 may be connected to the eighth sensing pad RP8.

The pad region PAD may protrude from one side of the first substrate SUB1.

For example, the side of the first substrate SUB1 from which the pad region PAD protrudes may be the long side of the second pressure sensor 520. Although it is illustrated in FIG. 22 that the pad region PAD protrudes from the center of the long side of the first substrate SUB1, the present disclosure is not limited hereto. That is, the pad region PAD may protrude from one end or the other end of the long side of the first substrate SUB1.

The driving pad TP and the sensing pads RP1 to RP8 may be disposed in the pad region PAD. The driving pad TP and the sensing pads RP1 to RP8 may be connected one-to-one to a driving lead line TL_F and sensing lead lines RL1_F to RL8_F of the pressure sensing circuit board 550 through an anisotropic conductive film. The driving pad TP may be connected to the driving lead line TL_F, the first sensing pad RP1 may be connected to the first sensing lead line RL1_F, the second sensing pad RP2 may be connected to the second sensing lead line RL2_F, the third sensing pad RP3 may be connected to the third sensing lead line RL3_F, and the fourth sensing pad RP4 may be connected to the fourth sensing lead line RL4_F. Similarly, the fifth sensing pad RP5 may be connected to the fifth sensing lead line RL5_F, the sixth sensing pad RP6 may be connected to the sixth sensing lead line RL6_F, the seventh sensing pad RP7 may be connected to the seventh sensing lead line RL7_F, and the eighth sensing pad RP8 may be connected to the eighth sensing lead line RL8_F.

The pressure sensing circuit board 550 may be connected to the display circuit board 310. In this case, the pressure sensing circuit board 550 may be electrically connected to the pressure sensor 330 that is mounted on the display circuit board 310. The pressure sensor 330 may apply a driving voltage to the driving line TL through the driving lead line TL_F of the pressure sensing circuit board 550 and the driving pad TP of the second pressure sensor 520, and sense current values or voltage values from the sensing lines RL1 to RL8 through the sensing lead lines RL1_F to RL8_F that are connected to the sensing pads RP1 to RP8 of the second pressure sensor 520, thereby sensing a pressure applied to the pressure sensing cells CE1 to CE8.

The second pressure sensor 520 may further include a bonding layer AHL disposed between the first substrate SUB1 and the second substrate SUB2 to bond the first substrate SUB1 and the second substrate SUB2 to each other. The bonding layer AHL may be a pressure-sensitive adhesive layer or an adhesive layer. The bonding layer AHL may be disposed along the periphery of the first substrate SUB1 and the second substrate SUB2. In an embodiment, the bonding layer AHL may serve to encapsulate the inside of the second pressure sensor 520 by completely surrounding the edges of the first substrate SUB1 and the second substrate SUB2. Moreover, the bonding layer AHL may serve as a spacer that maintains a gap between the first substrate SUB1 and the second substrate SUB2. Although the bonding layer AHL may not be formed in the pad region PAD, and thus does not overlap the driving line TL, the sensing lines RL1 to RL8, the pressure sensing cells CE1 to CE8, the driving pad TP, and the sensing pads RP1 to RP8, the present disclosure is not limited thereto. For example, the bonding layer AHL may be disposed to overlap at least a portion of the driving line TL, the sensing lines RL1 to RL8, the pressure sensing cells CE1 to CE8, the driving pad TP, and/or the sensing pads RP1 to RP8.

The bonding layer AHL may be first attached to one surface of the first substrate SUB1 or one surface of the second substrate SUB2, and then attached to the corresponding surface of the other substrate. As another example, the respective bonding layers AHL may be provided on each surface of the first substrate SUB1 and the second substrate SUB2, and the bonding layers of the first substrate SUB1 and the bonding layer AHL of the second substrate SUB2 may be attached to each other.

Referring to FIG. 22, each of the pressure sensing cells CE1 to CE8 may include a driving connection electrode TCE, a sensing connection electrode RCE, a plurality of driving electrodes TE1, a plurality of sensing electrodes RE1, and the pressure sensing layer PSL.

The driving connection electrode TCE, the sensing connection electrode RCE, the plurality of driving electrodes TE1, and the plurality of sensing electrodes RE1 may be disposed on the first substrate SUB1 facing the second substrate SUB2.

The driving connection electrode TCE may be connected to the driving line TL and the plurality of driving electrodes TE1. Specifically, the driving connection electrode TCE is connected to the driving line TL at one end in the length direction (Y-axis direction). The plurality of driving electrodes TE1 may be branched in the width direction (X-axis direction) of the driving connection electrode TCE.

The sensing connection electrode RCE may be connected to the plurality of sensing electrodes RE1 and any one of the sensing lines RL1 to RL8. Specifically, the sensing connection electrode RCE may be connected to any one of the sensing lines RL1 to RL8 at one end in the length direction (Y-axis direction). The plurality of sensing electrodes RE1 may be branched in the width direction (X-axis direction) of the sensing connection electrode RCE in an opposite direction of the plurality of driving electrodes TE1.

The plurality of driving electrodes TE1 and the plurality of sensing electrodes RE1 may be disposed on the same layer. The plurality of driving electrodes TE1 and the plurality of sensing electrodes RE1 may be made of the same material. For example, the plurality of driving electrodes TE1 and the plurality of sensing electrodes RE1 may include a conductive material such as silver (Ag) or copper (Cu). The plurality of driving electrodes TE1 and the plurality of sensing electrodes RE1 may be formed on the first substrate SUB1 by a screen printing method.

The plurality of driving electrodes TE1 and the plurality of sensing electrodes RE1 may be disposed adjacent to each other without being connected to each other. The plurality of driving electrodes TE1 and the plurality of sensing electrodes RE11 may be arranged in parallel with each other. The plurality of driving electrodes TE1 and the plurality of sensing electrodes RE1 may be alternately arranged in the length direction (Y-axis direction). That is, the plurality of driving electrodes TE1 and the plurality of sensing electrodes RE11 may be repeatedly arranged in the length direction (Y-axis direction), for example, in a repeating order of the driving electrode TE1 and the sensing electrode RE1, or vice versa.

The pressure sensing layer PSL is disposed on one surface of the second substrate SUB2 facing the first substrate SUB1. The pressure sensing layer PSL may be disposed to overlap the plurality of driving electrodes TE1 and the plurality of sensing electrodes RE1.

The pressure sensing layer PSL may include a pressure-sensitive material and a polymer resin in which the pressure-sensitive material is provided. The pressure-sensitive material may include fine metal particles (or metal nanoparticles) of nickel, aluminum, titanium, tin, or copper. For example, the first pressure sensing layer PSL may be formed of a quantum tunneling composite (QTC).

When a pressure is not applied to the second substrate SUB2 in the height direction (Z-axis direction) of the second pressure sensor 520, as shown in FIG. 23, a gap is maintained between the pressure sensing layer PSL and the driving electrodes TE1 and between the pressure sensing layer PSL and the sensing electrodes RE1. That is, when a pressure is not applied to the second substrate SUB2, the pressure sensing layer PSL is spaced apart from the plurality of driving electrodes TE1 and the plurality of sensing electrodes RE1.

When a pressure is applied to the second substrate SUB2 in the height direction (Z-axis direction) of the second pressure sensor 520, the pressure sensing layer PSL may be brought into contact with the plurality of driving electrodes TE1 and the plurality of sensing electrodes RE1. In this case, at least one of the driving electrode TE1 and at least one of the sensing electrodes RE1 may be physically connected to each other through the pressure sensing layer PSL, and the pressure sensing layer PSL may act as an electrical resistance.

Accordingly, a contact area of the pressure sensing layer PSL with the plurality of driving electrodes TE1 and the plurality of sensing electrodes RE1 may be changed depending on a pressure applied to the pressure sensing cells CE1 to CE 8 of the second pressure sensor 520, and the resistance value of any one of the sensing lines RL1 to RL8 that is electrically connected to the plurality of sensing electrodes RE1 may be changed. For example, the higher the pressure applied to the pressure sensing cells CE1 to CE 8 of the second pressure sensor 520, the lower the resistance value of the sensing lines RL1 to RL8. The pressure sensor 330 may sense a change in a current value or a voltage value from the sensing lines RL1 to RL8, thereby sensing the pressure applied by a user's hand.

Meanwhile, since the first pressure sensor 510 is substantially the same as the second pressure sensor 520 shown in FIGS. 22 and 23, a detailed description of the first pressure sensor 510 that is commonly applicable to the second pressure sensor 520 will be omitted.

FIG. 24 is a cross-sectional view showing an example of a display device.

Referring to FIG. 24, the cover window 100, the touch sensor 200, the display panel 300, the panel lower member 390, and the middle frame 600 of the display device 1000 may be formed to be flat in the first area DR1, and may be formed to be curved in the second area DR2.

The first pressure sensor 510 may be disposed in the second area DR2 corresponding to the curved portion of the display device 1000. The first bumps 530 may be disposed on the first pressure sensor 510. Each of the first bumps 530 may be attached to the lower surface of the panel lower member 390 through a fourth adhesive member 940, and may be attached to the upper surface of the first pressure sensor 510 through a sixth adhesive layer 960. Further, the first pressure sensor 510 may be attached to the upper surface of the middle frame 600 through a fifth adhesive member 950. The fourth adhesive member 940, the fifth adhesive member 950, and the sixth adhesive member 960 may be pressure-sensitive adhesives (PSA). Any one of the fourth adhesive member 940 and the fifth adhesive member 950 may be omitted.

The waterproofing member 400 may be disposed on an outer side of the first pressure sensor 510. That is, the waterproofing member 400 may be disposed on one side surface of the first pressure sensor 510 that is disposed closer to one side edge of the display panel 300. The waterproof member 400 may be attached to the lower surface of the panel lower member 390 and the upper surface of the middle frame 600. The waterproofing member 400 may include a base film, a first adhesive film disposed on one surface of the base film, and a second adhesive film disposed on the other surface of the base film. The base film may be a polyethylene terephthalate (PET) film, a polyethylene terephthalate (PET) film and a cushion layer, or a polyethylene foam (PE-foam). Each of the first adhesive film and the second adhesive film may be a pressure-sensitive adhesive layer. The first adhesive film may be adhered to the lower surface of the panel lower member 390, and the second adhesive film may be adhered to the upper surface of the middle frame 600.

According to the embodiment shown in FIG. 24, the waterproofing member 400 is disposed on the outer side of the first pressure sensor 510 to attach the lower surface of the panel lower member 390 to the upper surface of the middle frame 600, so that it can prevent water or dust from penetrating between the display panel 300 and the middle frame 600. That is, the display device 1000 may be provided to be waterproof and dustproof.

Meanwhile, since the second pressure sensor 520 is disposed at the left edge of the display panel 300, the layout position of the waterproofing member 400 and the second pressure sensor 520 is different from the layout position of the waterproofing member 400 and the first pressure sensor 510 only in that the waterproofing member 400 is disposed on the left side surface of the second pressure sensor 520. Therefore, a detailed description of the layout position of the waterproofing member 400 and the second pressure sensor 520 will be omitted.

As described above, the test apparatus 1 of the display device 1000 according to various embodiments of the present disclosure can measure a normal response and sensitivity of the pressure sensors 510 and 520 disposed on the edges of display device 1000.

Further, the display device 1000 according to various embodiments of the present disclosure cab adjust an operation threshold value of the pressure sensors 510 and 520 by correcting the measured pressure values.

The effects of the present disclosure are not limited by the foregoing, and other various effects are anticipated herein.

Although the exemplary embodiments of the present disclosure have been disclosed for illustrative purposes, those skilled in the art will appreciate that various modifications, additions and substitutions are possible, without departing from the scope and spirit of the present disclosure as disclosed in the accompanying claims.

What is claimed is:

1. A test method, comprising:
   placing a test member on a mounting portion;
   adjusting an inclined angle of the mounting portion using an angle adjusting portion;
   adjusting a position of a pressing guide to correspond to a measurement position of the test member;
   pressing the test member using a pressing member of the pressing guide; and
   transmitting pressure information measured by at least one pressure sensor internal to the test member to an external appliance and displaying the pressure informations,
   wherein, in the pressing the test member using the pressing member of the pressing guide, amounts of pressure applied to the test member are sequentially changed, operation time of the test member is checked, and a pressure threshold value at which the test member operates is recorded on a storage.

2. The method of claim 1,
   wherein the test member is a display device including a flat portion and at least one curved portion extending from the flat portion, and the at least one curved portion is provided with the at least one pressure sensor.

3. The method of claim 2,
   wherein, in the adjusting the inclined angle of the mounting portion using the angle adjusting portion, the inclined angle of the mounting portion is adjusted such that the pressing member vertically presses the curved portion of the display device.

* * * * *